(12) United States Patent  
Calley

(10) Patent No.: US 6,664,704 B2
(45) Date of Patent: Dec. 16, 2003

(54) ELECTRICAL MACHINE

(76) Inventor: David Gregory Calley, 10220 Ciervo Trail, Flagstaff, AZ (US) 86004

( * ) Notice: Subject to any disclaimer, the term of this patent is extended or adjusted under 35 U.S.C. 154(b) by 0 days.

(21) Appl. No.: 10/273,238

(22) Filed: Oct. 17, 2002

(65) Prior Publication Data

US 2003/0102769 A1 Jun. 5, 2003

Related U.S. Application Data

(60) Provisional application No. 60/333,248, filed on Nov. 23, 2001.

(51) Int. Cl.[7] .............................. H02K 1/00; H02K 21/02
(52) U.S. Cl. .................. 310/257; 310/152; 310/154.02; 310/156.02; 310/164; 310/216; 310/254
(58) Field of Search ................................. 310/254, 261, 310/156, 154, 152, 113, 266, 162, 257, 163, 216, 164

(56) References Cited

U.S. PATENT DOCUMENTS

| | | | |
|---|---|---|---|
| 2,078,668 A | | 4/1937 | Kilgore |
| 3,437,854 A | * | 4/1969 | Oiso ........................ 310/49 R |
| 3,710,158 A | * | 1/1973 | Bachle et al. .......... 310/156.02 |
| 4,021,691 A | | 5/1977 | Dukshtau et al. |
| 4,237,396 A | * | 12/1980 | Blenkinsop et al. ... 310/154.06 |
| 4,658,166 A | * | 4/1987 | Oudet ................... 310/156.02 |
| 4,900,965 A | | 2/1990 | Fisher |
| 5,051,641 A | * | 9/1991 | Weh ........................... 310/163 |
| 5,117,142 A | * | 5/1992 | von Zweygbergk .... 310/156.02 |
| 5,212,419 A | | 5/1993 | Fisher et al. |
| 5,382,859 A | | 1/1995 | Huang et al. |
| 5,633,551 A | * | 5/1997 | Weh ........................... 310/266 |
| 5,773,910 A | * | 6/1998 | Lange ......................... 310/266 |
| 5,777,418 A | * | 7/1998 | Lange et al. ................. 310/255 |
| 5,894,183 A | | 4/1999 | Borchert |
| 5,973,436 A | * | 10/1999 | Mitcham ..................... 310/266 |
| 6,060,810 A | * | 5/2000 | Lee et al. .................... 310/254 |
| 6,154,013 A | | 11/2000 | Caamano |
| 6,163,097 A | | 12/2000 | Smith et al. |
| 6,177,748 B1 | | 1/2001 | Katcher et al. |
| 6,232,693 B1 | | 5/2001 | Gierer et al. |
| 6,236,131 B1 | * | 5/2001 | Schafer ....................... 310/163 |
| 6,455,970 B1 | * | 9/2002 | Shafer et al. ............... 310/179 |
| 6,492,758 B1 | * | 12/2002 | Gianni et al. ............... 310/257 |

FOREIGN PATENT DOCUMENTS

| | | | | |
|---|---|---|---|---|
| DE | 3602687 | * | 8/1987 | .......... H02K/19/02 |
| DE | 3927453 | * | 2/1991 | .......... H02K/21/00 |
| DE | 19634949 | * | 5/1998 | .......... H02K/21/02 |
| EP | 1063754 | * | 12/2000 | .......... H02K/21/12 |

* cited by examiner

Primary Examiner—Burton Mullins
(74) Attorney, Agent, or Firm—John Vanden Bosche

(57) ABSTRACT

A motor/alternator is formed by a single toroidal magnet, which may be a hybrid magnet, having flux conductors which, in combination with flux switches, create an alternating magnetic circuit around a power coil. The motor/alternator minimizes the amount of material experiencing hysteresis by making the flux switches small and reduces eddy currents in the flux conductors by using a material very resistant to eddy currents. The subsequent reduction in core losses allows for very high electronic frequency operation and thus a high power density. The form of the flux conductors allows for a high number of poles in the motor/alternator thus enabling a high electronic frequency at modest rotational speed.

24 Claims, 29 Drawing Sheets

ELECTRICAL MACHINE

RELATED APPLICATIONS

This application claims priority under 35 U.S.C. § 119(e) to U.S. Provisional Patent Application No. 60/333,248 which was filed on Nov. 23, 2001 and which is incorporated herein by reference.

FIELD OF THE INVENTION

Embodiments of the invention relate to an electrical machine that can function as either a motor or a generator. The machine uses high frequency commutation of magnetic flux to achieve high efficiency and high power density.

BACKGROUND OF THE INVENTION

Motors and alternators are designed for high efficiency, high power density, and low cost. High power density optionally is achieved by operating an alternator at high rotational speed and therefore high electrical frequency. However, high electrical frequency results in high core losses and lower efficiency. It would be desirable to provide a motor and alternator which had very low core losses thus making it practical to run it at high electrical frequency.

If a high rotational speed cannot be provided then the prior art motor or alternator must have a large number of poles to provide a high electrical frequency at low rotational speed. There is a practical limit to the number of poles a prior art motor or alternator can have due to space limitations, so once that limit is reached in order to reach a certain power level the motor or alternator must be relatively large and have the low power density inherent in low rotational speeds. It would be desirable to provide a motor or alternator that could have many times the number of poles currently possible providing high power density and good efficiency even at low rotational speed.

Another issue with prior art motors and alternators is that they require either a permanent magnet or an electromagnet to provide a magnetic field. Each type of magnet has some advantages and some disadvantages so that it is necessary to make a trade-off decision between the two types of magnets. Permanent magnets provide simplicity and they have the advantage that they do not require electrical input and thus allow a brushless motor or alternator. Permanent magnets also make it possible to design a motor or alternator of relatively high power density. However, they do not allow for operation over a wide speed range and they cannot be de-energized if desired. Electromagnets can be de-energized however they take up more space and require slip rings to draw power, power which is a parasitic loss for the system. Therefore, to avoid the need for a clutch, many machines must settle for a motor or alternator with lower power density, lower efficiency, and higher complexity. It would be desirable to provide a motor and alternator that could combine the advantages of permanent magnets and electromagnets.

The design trade-offs of existing motors and alternators have hindered commercial success of some motors and alternators. For instance, hub motors to drive the wheels of vehicles have not been commercialized because the low speed output requires a large motor that is not compatible with weight and size requirements of a vehicle suspension and drive system. A successful hub motor would require a power density that is many times higher than provided by prior art motors and it would have to maintain good efficiency and have variable field strength. Such a motor would go a long way toward making electric vehicles and hybrid-electric vehicles commercially acceptable.

SUMMARY OF THE INVENTION

Embodiments of the present invention provide a motor/alternator that provides a power density that is many times higher than prior art devices. This is achieved primarily by greatly reducing the core losses, allowing the motor/alternator to run at a much higher electrical frequency. Since it operates at high electrical frequency, at a given rotational speed, if the device is operated as an alternator, the output voltage is higher than for a prior art alternator. This reduces the current flowing through the windings and substantially lowers resistive losses in the device.

Conventional motors and alternators use varying electrical current within the windings to create a varying magnetic field in either the stator the rotor or both. Embodiments of the present invention instead vary a constant magnetic field by altering the flux path of said magnetic field. Hysteresis and eddy currents are the main sources of core loss. Hysteresis is caused by the reversal of magnetic polarity in a material and eddy currents are caused by change of magnetic field strength in a material whether or not the field reverses. Embodiments of the present invention achieve low core losses by preventing hysteresis in the bulk of the core and for this part of the core using a material resistant to eddy currents, such as powdered iron. Embodiments of the present invention further reduce core losses by using a material subject to low hysteresis losses in the small fraction of the core that does experience a reversal of magnetic field.

The motor/alternator according to embodiments of the present invention uses a single magnet with a north pole and a south pole. The magnet optionally is a permanent magnet or an electromagnet or a combination of the two. A plurality of flux conductors direct the magnetic field of the single magnet. Half of the flux conductors are in contact with the north pole of the magnet so that they have positive polarity and half of the flux conductors are in contact with the south pole of the magnet so that they have negative polarity. The north and south flux conductors are separated from each other by an air gap that is sufficient to minimize flux leakage between the conductors. A plurality of switch devices are attached to a rotor. The switch devices make contact between the flux conductors to alternately open and close a magnetic circuit for conducting magnetic flux between the north and south poles of the device's magnet. These flux switches are the only part of the device undergoing hysteresis. The flux conductors are arranged so that they alternately conduct the magnetic flux in opposite directions around a power coil. Half of the flux conductors create a clockwise magnetic field around the power coil and the other half create a counter-clockwise magnetic field around the coil. As the switch devices open and close the alternating magnetic circuits, the polarity of the magnetic field surrounding the power coil is reversed. When used as an alternator, the reversal of the polarity of the magnetic field induces an alternating EMF voltage in the power coil. If an AC voltage is applied to the power coil, then the device will act as a motor by causing the switch devices on the rotor to move between flux conductors.

The flux conductors can be very small so many pairs can fit within a small space before they become too close and magnetic leakage occurs. Since each pair of flux conductors consists of one pole in the motor/alternator, many times more poles are possible with embodiments of the present invention than with prior art motors and alternators. The high number of poles allows embodiments of the present invention to achieve the high electrical frequency required for a high power density while running at modest rotational speed.

A device according to embodiments of the invention has the advantage that it uses only a single magnet. This allows for very simple and economical construction compared to many prior art motors and alternators. Embodiments of the present invention result in a motor or alternator with a large number of poles that does not require a large number of magnets. Furthermore since the magnet is on the stator there is no need for slip rings to bring electric current to the electromagnet, greatly simplifying its implementation. Since the magnet optionally is either a permanent magnet or an electromagnet, there is great flexibility in selecting the magnet that works best for the desired use. One possibility is that the magnet is a hybrid permanent magnet, electromagnet combination. In this arrangement a permanent magnet provides a fixed strength magnetic field and an additional electromagnet is used to augment the field to strengthen it or potentially to reduce it. By adjusting the strength of the field from the electromagnet, the total field strength of the motor or alternator is optionally adjusted as necessary.

An alternate embodiment of the present invention provides a three phase device. In its three phase embodiment still only one magnet or hybrid magnet is needed which magnetizes flux conductors which surround three separate coils arrayed one above another. Flux switches are arrayed such that a magnetic circuit is completed around one coil at a time. The flux switches are spaced such that three phase output is created when used as an alternator, and such that three phase power drives the device when used as a motor.

Embodiments of the present invention have many possibilities in layout and geometry. The rotor optionally is on the inside or the outside of the stator, or even on the face. The flux switches and flux conductors optionally take a variety of shapes depending e.g. on the intended use. The magnet optionally is permanent, electric, or both. There are still more variations possible not described here but well within the scope of the invention.

The motor/alternator according to embodiments of the present invention operates at very high electrical frequency for a given rotational speed compared to prior art devices. This results in very high power density. In one embodiment, the operating electrical frequency is ten times higher than prior art devices for a given rotational speed. This results in a power density that is ten times higher. The high frequency operation also results in decreased need for capacitors to smooth the power output when the device is used as an alternator. The high frequency operation further allows the device to operate at much higher voltage compared to prior art devices, thereby improving the battery charging capability of the device or simplifying its interface with an inverter. The higher voltage also results in smaller wires in the device, lower current, and lower power losses.

Additional features and advantages according to the invention in its various embodiments will be apparent from the remainder of this disclosure.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE DRAWINGS

The present invention is shown and described in a number of different embodiments, and primarily in four specifically described embodiments. The first of the specifically described embodiments is a single phase device. The second is also a single phase device with different flux path geometry. The third describes a three phase version of the device. The fourth is a single phase version of the device with its rotor on the inside of the stator. There are other embodiments of this device beyond those most specifically described (such as a three phase device with the rotor on the inside) which although not explicitly described herein are implicit from or will be fully understood from these four embodiments.

Figure 1:
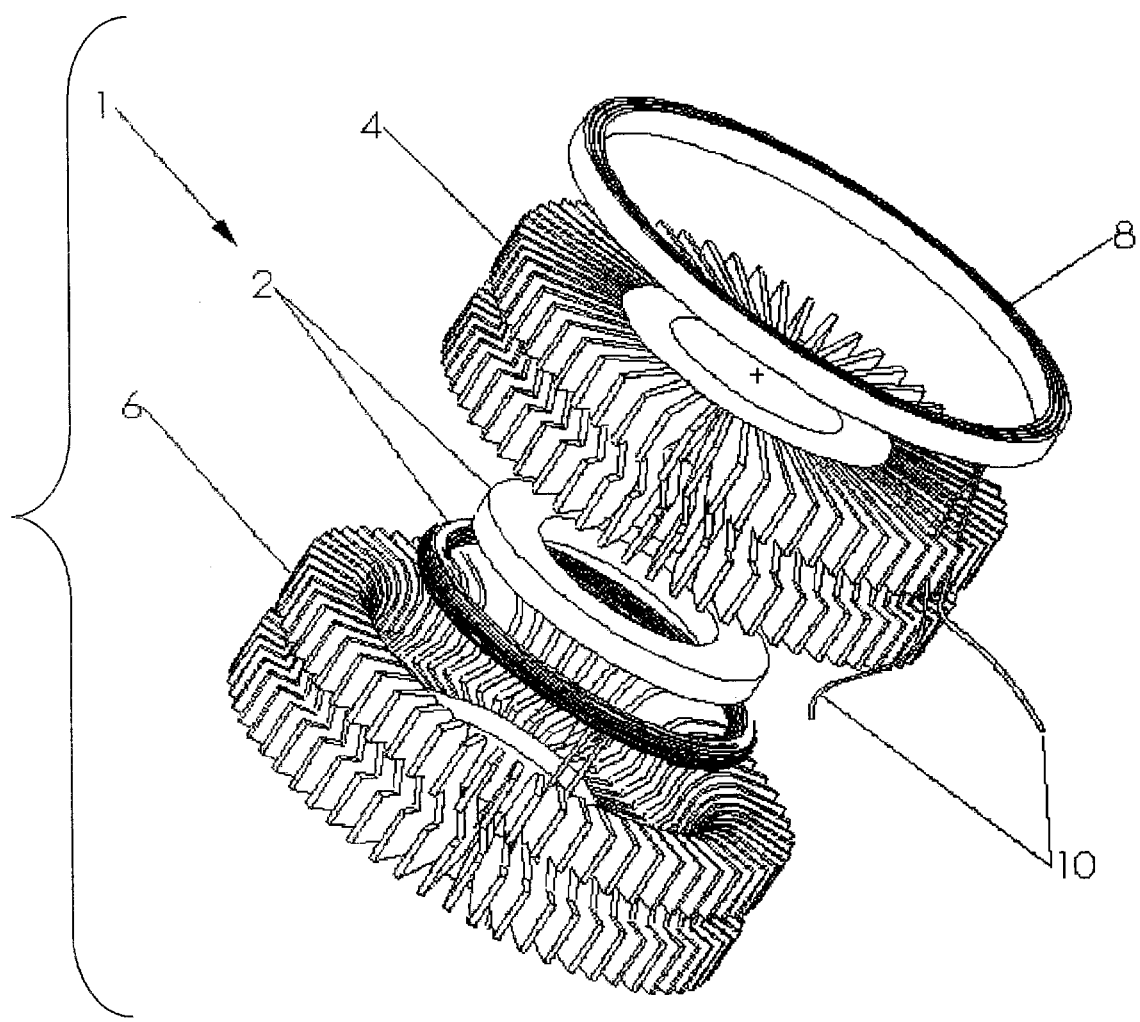
FIG. 1 shows an exploded view of a stator assembly according to an embodiment of the present invention.

As shown in FIG. 1, embodiments of the present invention include a stator 1 that has a ring magnet 2, a set of north pole flux conductors 4, a set of south pole flux conductors 6, and a power coil 8. The north and south pole flux conductors 4 and 6 are in direct contact with the magnet 2. The flux conductors 4, 6 are made of a material that easily conducts a magnetic field. Ferrous materials work well, and one specific material is powdered metal although other materials optionally are used. The flux conductors 4 and 6 direct the magnetic field of the magnet 2 toward the power coil 8. The power coil 8 is an electrical coil in which electrical voltage is generated when the device is used as an alternator. When used as a motor, the power coil 8 provides voltage and current to power the device. The power coil 8 includes electrical leads 10 that collect the output power when the device is used as an alternator or provide power when it is used as a motor.

Figure 2:
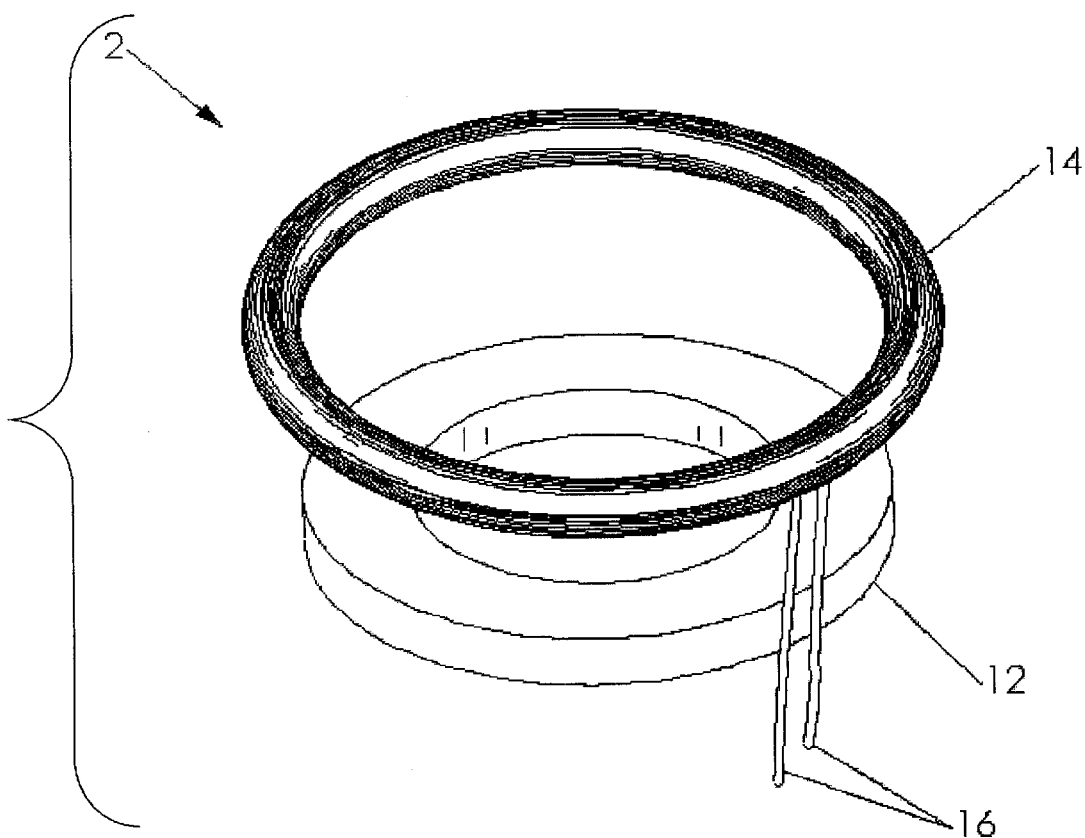
FIG. 2 shows an exploded view of a magnet assembly according to an embodiment of the present invention.

FIG. 2 is an exploded view of the ring magnet of FIG. 1 in greater detail. One embodiment of the present invention is a hybrid magnet including a permanent magnet 12 and an electromagnet 14 concentrically arranged, although embodiments of the invention optionally include only permanent magnet 12 singly or an electromagnet 14 singly. In the configuration of the magnet 2 with only a permanent magnet 12, the electromagnet 14 is absent as are electrical leads 16 connected to the electromagnet 14. In a configuration of the magnet 2 with only an electromagnet 14, the permanent magnet 12 is replaced by a cylinder of ferromagnetic material having the same shape as the permanent magnet to conduct the magnetic flux generated by the electromagnet 14. The magnetic field is then increased or decreased by adjusting the voltage applied to the electrical leads 16 of the electromagnet 14. In one configuration of the magnet 2 in which both a permanent magnet 12 and an electromagnet 14 are used as a hybrid magnet, the electromagnet 14 optionally adds to or subtracts from the magnetic field of the permanent magnet 12. This allows the field strength to be adjusted by the electromagnet 14 when desired for start up, clutching, or braking, while also allowing the motor/alternator to run for the majority of the time without an outside current source using only the field generated by the permanent magnet 12.

Figure 3:
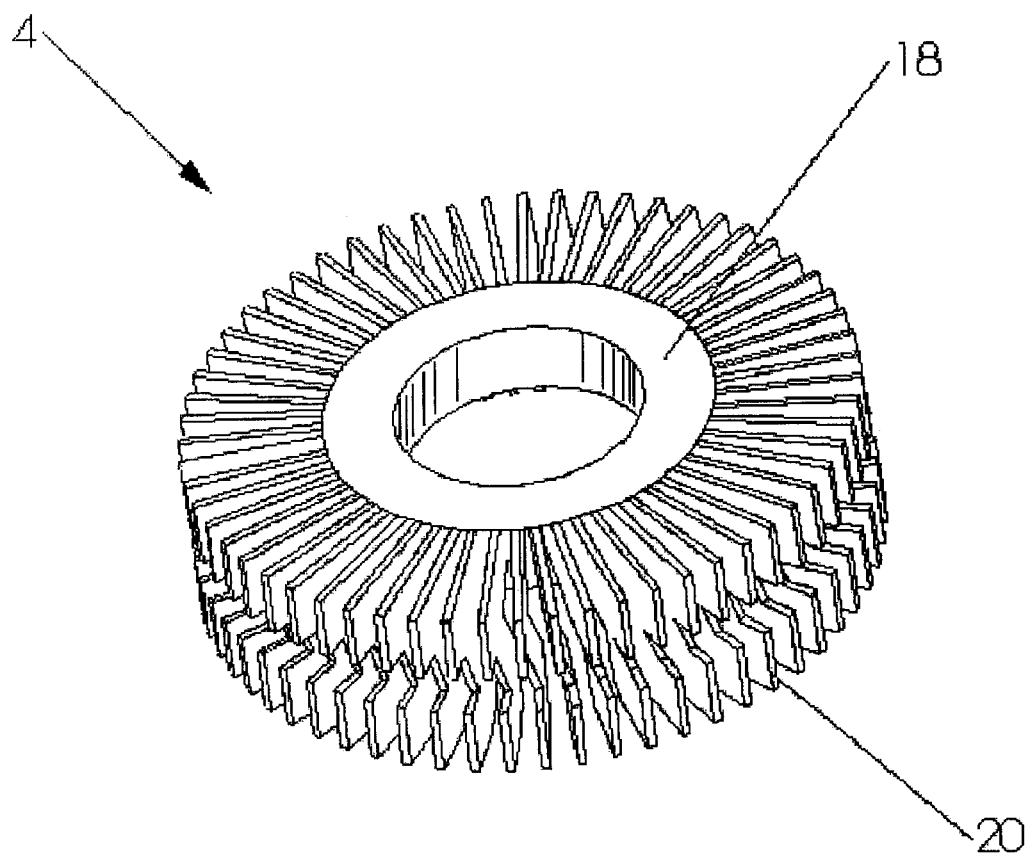
FIG. 3 shows flux conductors connected to the north pole of a magnet according to an embodiment of the present invention.

The flux conductors 4 that connect to the north pole of the magnet 2 are optionally formed as a single piece as shown in FIG. 3. The flux conductors include a mounting ring 18 that provides a structural support for the flux conductor. Mounting ring 18 contacts the north side of the magnet 2 (not shown) and retains the magnet 2 in its place. Attached to the mounting ring 18 are a plurality of flux conductor laminates 20. The laminates 20 conduct the magnetic field from the magnet 2 to the appropriate locations. Each laminate 20 extends radially outward from the mounting ring 18 and splits into two conducting portions.

Figure 4:
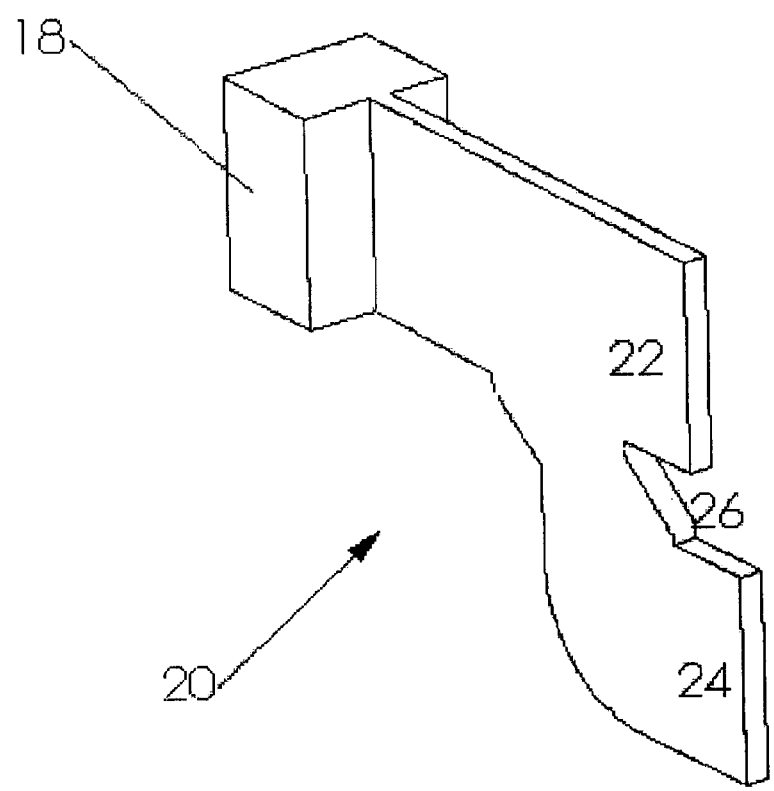
FIG. 4 shows a single north flux conducting laminate according to an embodiment of the present invention.

FIG. 4 shows a single north flux conductor laminate 20. An upper conducting portion 22 extends directly radially outward from the mounting ring 18. A lower conducting portion 24 extends downwardly from the upper conducting portion 22. In between the upper and lower conducting portions 22, 24, there is a notch 26 defined within each laminate 20 to hold the power coil 8 (not shown). In addition to extending downwardly, each of the lower conducting portions 24 is bent so that the lower conducting portions 24 are not vertically aligned with the upper conducting portions 22. Each of the lower conducting portions 24 is circumferentially spaced to be half way between two adjacent upper conducting portions 22. In one embodiment, the flux conductor 4 of FIG. 3 includes sixty laminates 20 so that the rotational separation between two laminates 20 is six degrees. Since the lower conducting portion 24 is offset circumferentially from the upper conducting portion 22, the total offset between the two conducting portions 22 and 24 is three degrees. The flux conductor 4 is optionally cast as a single piece out of powdered metal. However, the flux conductor 4 optionally is fabricated so that the mounting ring 18 is a single piece and each laminate 20 is a separate piece that is securely attached to the mounting ring 18.

Figure 5:
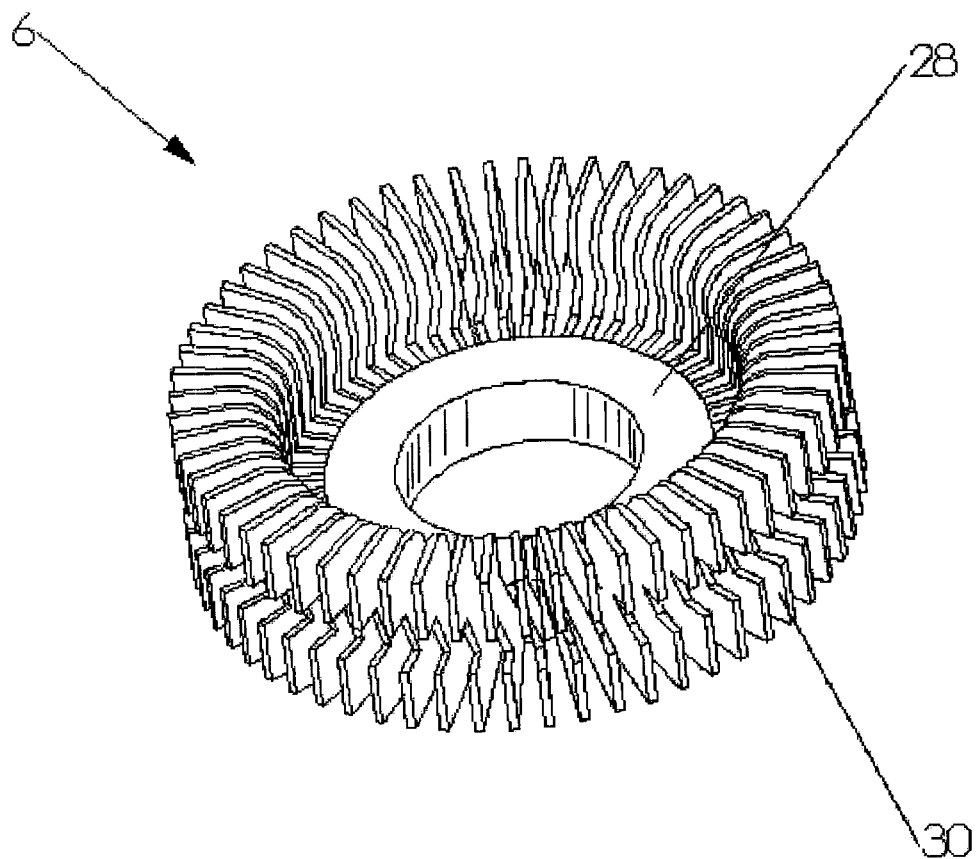
FIG. 5 shows flux conductors connected to the south pole of a magnet according to an embodiment of the present invention.

Another set of flux conductors 6 is shown in FIG. 5. The flux conductors 6 are magnetically connected to the south pole of the magnet 2 (not shown). Flux conductors 6 are of similar construction to flux conductors 4 of FIG. 3. Flux conductors 6 include a mounting ring 28 that connects to the south pole of the magnet 2. Laminates 30 project radially outwardly from the mounting ring 28.

Figure 6:
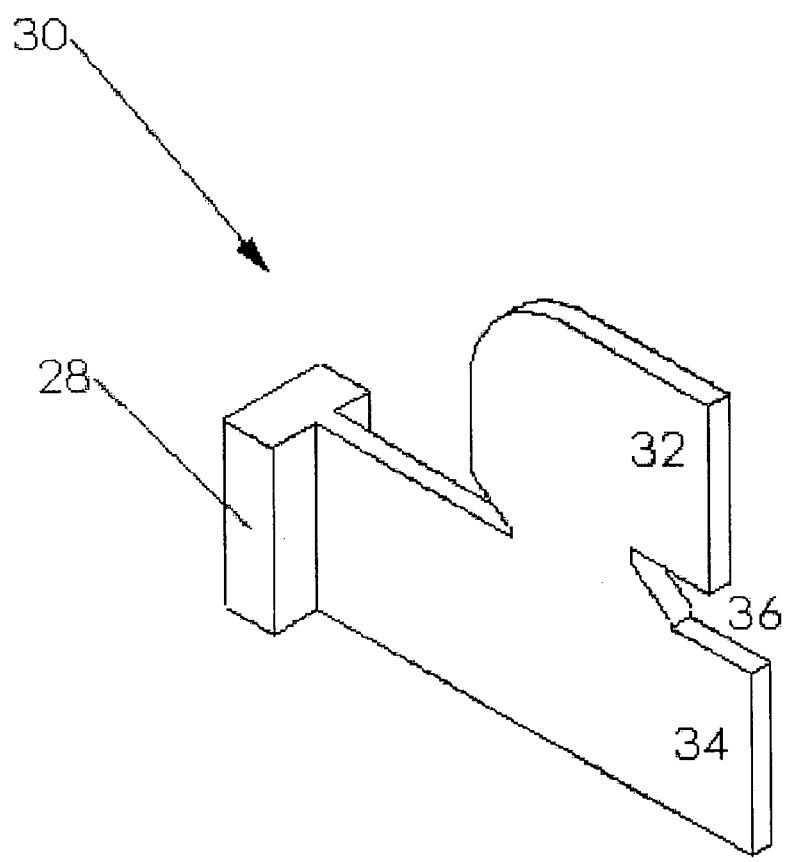
FIG. 6 shows a single south flux conducting laminate according to an embodiment of the present invention.

FIG. 6 shows that a laminate 30 of flux conductor 6 is separated into an upper conducting portion 32 and a lower conducting portion 34 which extends radially from the mounting ring 28. There is a notch 36 defined between the upper conducting portion 32 and lower conducting portion 34 to hold the power coil 8 (not shown). The upper conducting portions 32 are offset circumferentially relative to the lower conducting portions 34 so that the two sets of conducting portions 32 and 34 are staggered.

Figure 7:
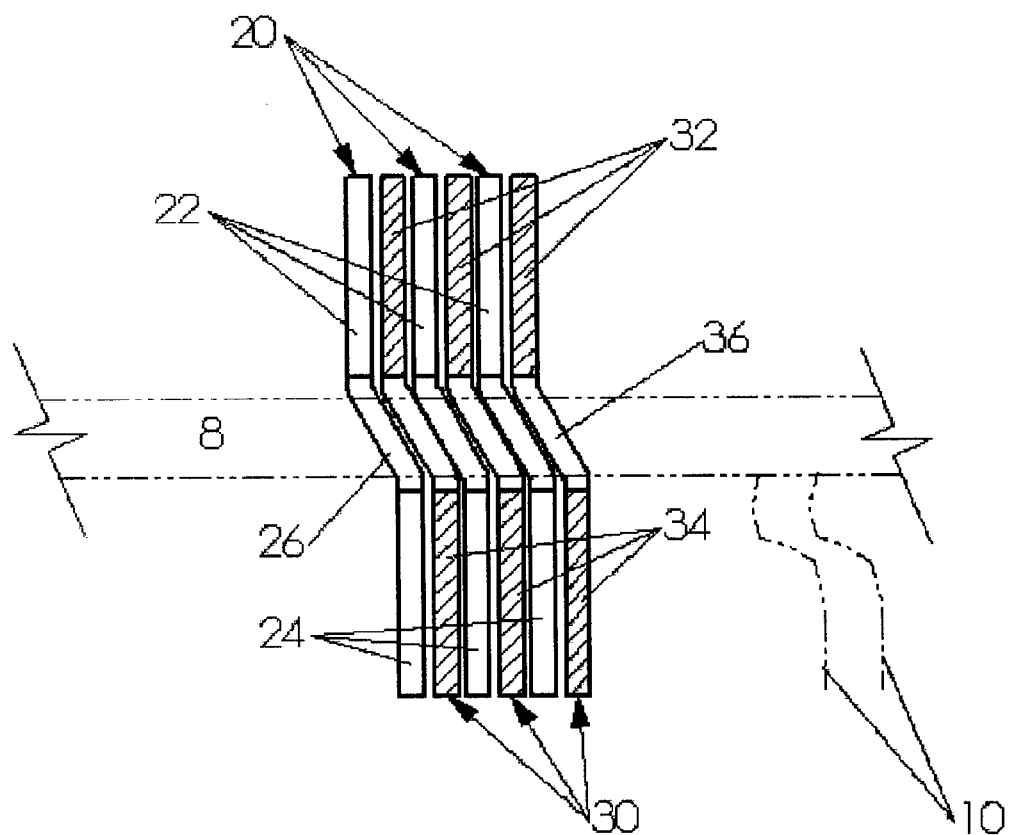
FIG. 7 shows three flux conductors connected to the north pole of a magnet laminate and three flux conductors connected to the south pole of a magnet laminate according to an embodiment of the present invention.

Flux conductors 4 and 6 of FIG. 1 are oriented relative to each other so that the laminates 20 of the north pole flux conductors 4 are interspersed with the laminates 30 of the south pole flux conductors 6 as shown in FIG. 7. The laminates 20, 30 are spaced appropriately so that there will be little or no flux leakage through the air gap between adjacent laminates. A space of approximately 50 thousandths of an inch should be sufficient to minimize flux leakage. The upper and lower conducting portions 22 and 24 of the north pole laminates 20 and the upper and lower conducting portions 32 and 34 of the south pole laminates 30 are staggered so that the upper conducting portion 22 of each north pole laminate 20 is vertically aligned with the lower conducting portion 34 of a south pole laminate 30. Similarly, the lower conducting portion 24 of each north pole laminate 20 is vertically aligned with the upper conducting portion 32 of a south pole laminate 30. FIG. 7 shows an edge-on view of three of the north pole laminates 20 and three of the south pole laminates 30.

The power coil 8 has electrical leads 10 which transmit the power generated or required by the motor/alternator, according to an embodiment of the present invention. Once the north flux conductors 4 and the south flux conductors 6 are assembled around the magnet 2 (referring to FIG. 1), for example, the power coil is wound into the notches 26, 36. The power coil 8 is optionally wound from a copper foil that fits in the notch with a layer of insulation (not shown) between windings, or is made from windings of insulated rectangular wire. Alternately the power coil optionally is wound with normal round insulated wire but has a lower packing factor than with foil or rectangular wire. There optionally is a 'U' shaped track of insulating material (not shown), for example, laid down in the notch 26, 36 in which the power coil 8 is wound to generally prevent or reduce the likelihood of the power coil 8 shorting out on the flux conducting laminates 20, 30.

Figure 8:
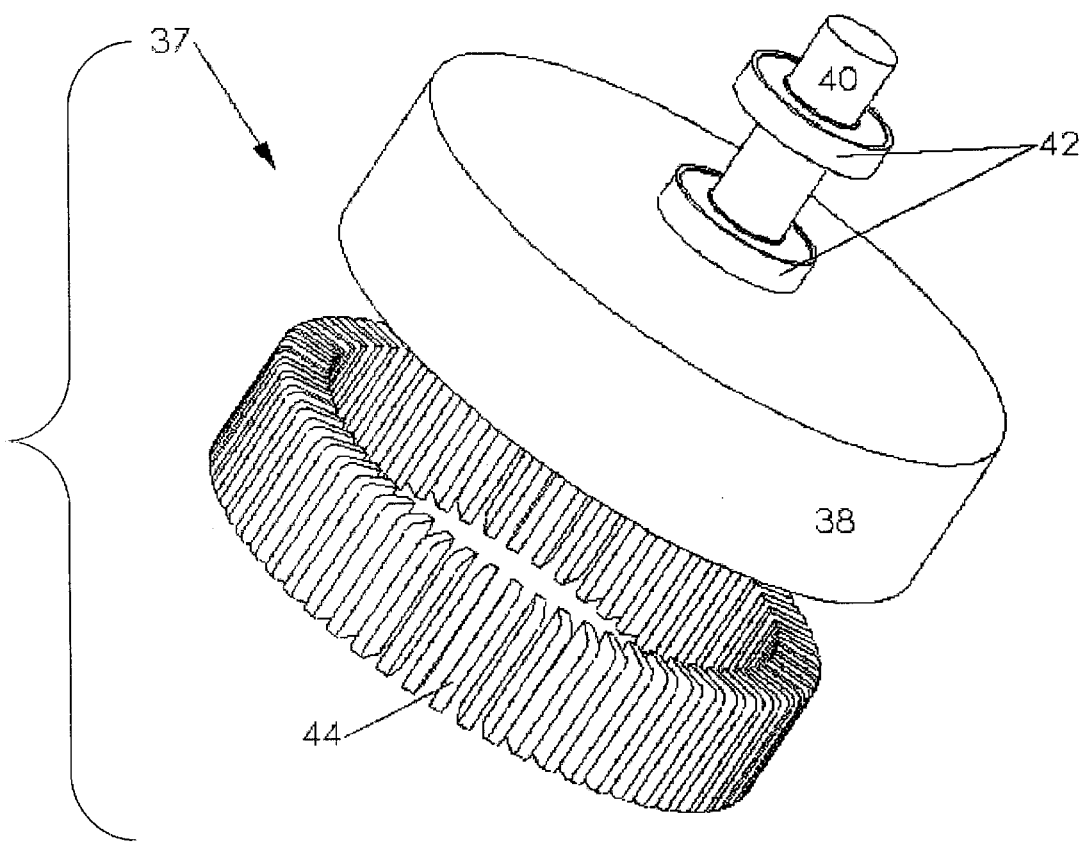
FIG. 8 shows an exploded view of a rotor assembly according to an embodiment of the present invention.

Up to this point, the stator 1 of the motor/alternator has been described. In order to function as a motor or an alternator the device includes a rotor that provides input rotation and torque when used as an alternator and transmits rotation and torque when used as a motor. FIG. 8 shows the rotor 37 of the motor/alternator. The rotor 37 includes a rotor cup 38 mounted on a shaft 40 that rotates in bearings 42. The shaft 40 is driven by the device when it acts as a motor or it drives the device when it acts as an alternator, according to embodiments of the invention. Attached to the inside of the rotor cup 38 there are a plurality of flux switches 44. One embodiment includes sixty flux switches 44 attached to the inside of the rotor cup 38 at six degree intervals.

Figure 9:
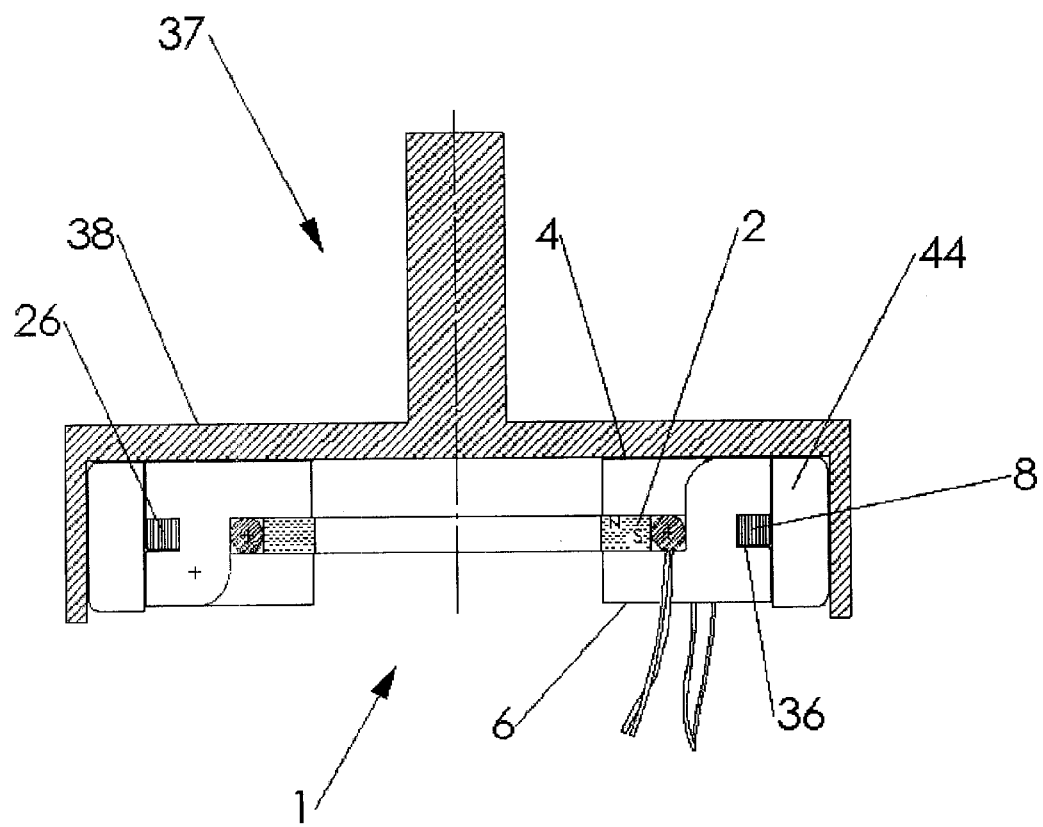
FIG. 9 shows a partial cross section of a motor alternator according to an embodiment of the present invention.

FIG. 9 shows a sectional side view of the motor/alternator according to an embodiment of the present invention. Mounted to the rotor cup 38, there is a flux switch 44 that rotates along with the rotor 37. The stator 1 includes a magnet 2 which provides a magnetic field with the north pole facing upward and the south pole facing downward. Flux conducting laminates 4 and 6 are in contact with the magnet 2. The flux conductors 4 and 6 conduct the magnetic field from the magnet 2 very effectively so that essentially all of the magnetic flux from the magnet 2 is directed through the flux conductors 4 and 6. The flux conductors 4 and 6 include notches 26 (not shown) and 36 in which the power coil 8 is mounted. The flux switch 44 contacts the flux conductors 4 and 6 to complete a magnetic circuit and conduct the magnetic flux from magnet 2. The magnetic circuit defined by flux conductors 4 and 6 and flux switch 44 encircles the power coil 8 so that a change in the magnetic field passing within the circumference of the power coil 8 induces an EMF voltage in the power coil and the device acts as an alternator.

Figure 10:
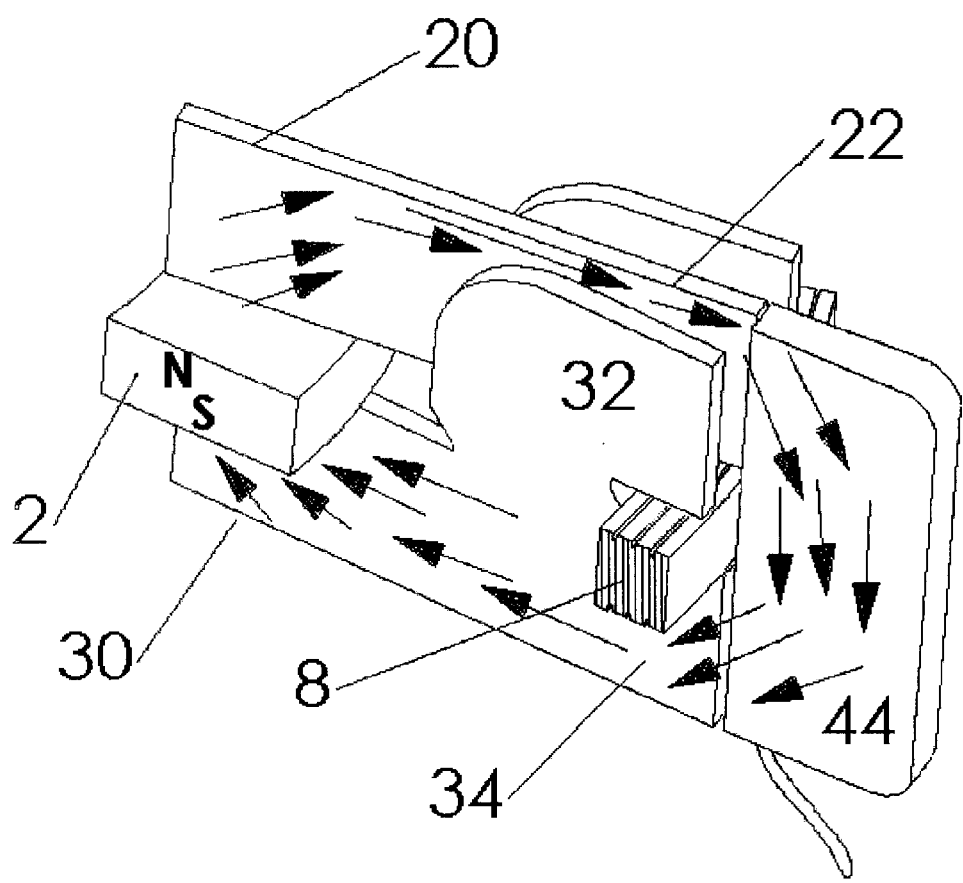
FIG. 10 shows magnetic flux in flux conductors during a first orientation of a rotor according to an embodiment of the present invention.
Figure 11:
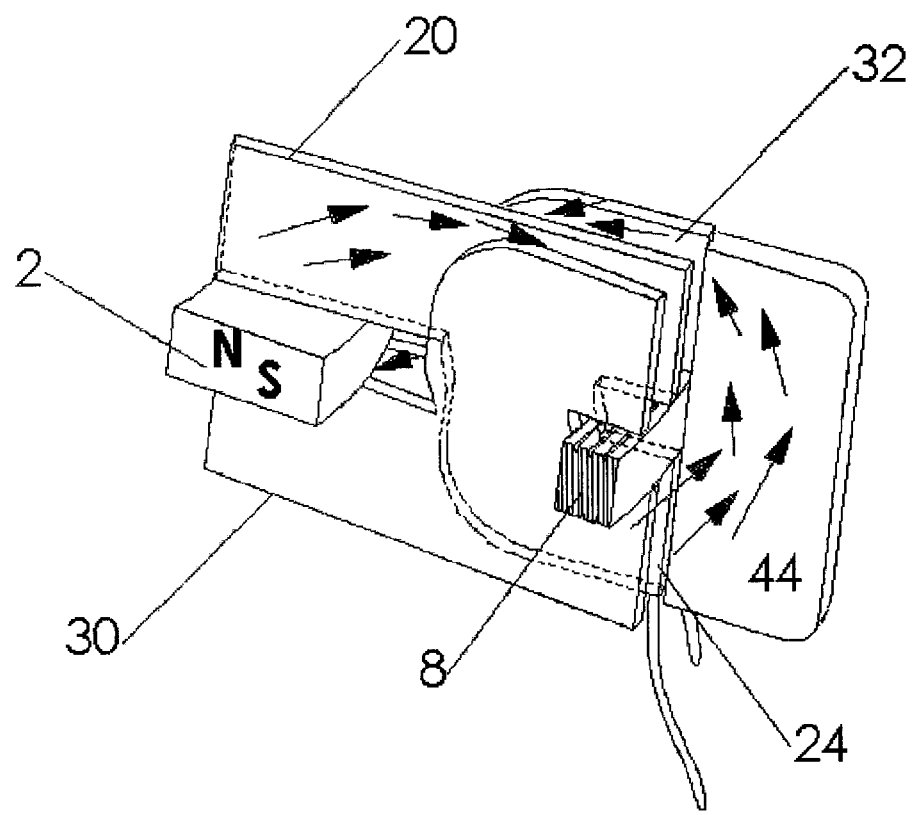
FIG. 11 shows magnetic flux in flux conductors during a second orientation of a rotor according to an embodiment of the present invention.

The method in which the magnetic field in flux conductors 4 and 6 and the flux switch 44 is varied to induce a voltage in the power coil 8 can better be understood with reference to FIGS. 10 and 11. FIG. 10 shows a portion of the stator 1 together with the flux switch 44 when the rotor 37 is in a first position. In FIG. 10, the flux switch 44 contacts the upper conducting portion 22 of a north pole flux conductor laminate 20 and the lower conducting portion 34 of a south pole flux conductor laminate 30. The magnetic flux from the magnet 2 is directed radially outward through the north pole flux conductor laminate 20 through upper conducting portion 22, then downward through the flux switch 44, and finally radially inward through lower conducting portion 34 along the south pole flux conductor laminate 30 where the flux re-enters the south pole of the magnet 2. As the rotor 37 spins, the flux switch 44 passes by the flux conducting portions 22 and 34 and temporarily contacts the laminates 20 and 30 to form this circuit.

FIG. 11 shows a portion of the stator 1 together with the flux switch 44 in a configuration that occurs a moment after the configuration shown in FIG. 10 (three degrees of rotation later in one embodiment). As the rotor 37 turns, the flux switch 44 advances from one pair of flux conducting portions 22 and 34 to the next pair 24 and 32. In the configuration shown in FIG. 11, the magnetic flux from magnet 2 is directed radially outward through the north pole flux conducting laminate 20. However, when the flux is part way out the laminate 20 it is directed downward through the lower conducting portion 24 of the laminate 20. The magnetic flux then enters the bottom of the flux switch 44 and is directed upward through the flux switch 44. At the top of the flux switch 44, the magnetic flux enters the upper conducting portion 32 of the south pole flux conducting laminate 30. The magnetic flux is then directed downward through the flux conducting laminate 30 and then it re-enters the south pole of the magnet 2. In the configuration shown in FIG. 11, the flux follows a path that defines a "figure 8".

The main difference between the configurations shown in FIG. 10 and in FIG. 11 is the magnetic flux passing within the circumference of the power coil 8. In FIG. 10 the flux follows a path that moves in a clockwise direction around the power coil 8 passing in the upward direction within the circumference of power coil 8 once. In contrast the configuration shown in FIG. 11 causes the magnetic flux to follow a "figure 8" path around the power coil 8. The flux path travels upward through power coil 8 once near the center then travels downward through the interior then upward outside of the power coil's 8 circumference then downward again through the interior. The sum of magnetic flux in the position shown in FIG. 11 is one pass of the flux in the upward direction minus two passes in the downward direction which is equivalent to one pass downward. In one embodiment, every three degrees of rotation the flux switch 44 moves between pairs of laminates 20, 30 and the net magnetic flux passing within the circumference of the power coil 8 reverses and induces an AC voltage in the power coil 8. The AC power generated in the power coil then optionally is reformed into DC power using standard techniques familiar to those skilled in the art upon reading this disclosure.

If the device is operated as a motor, then an AC current is applied to the power coil 8 and a magnetic field encircling the power coil 8 passes through the flux switch 44. Referencing FIG. 11, when the current is flowing out of the page through power coil 8, the induced magnetic field encircling power coil 8 is in the counter clockwise direction and thus the magnetic field in the flux switch 44 is in the upward direction reinforcing the magnetic flux present at that position. When the direction of current in the power coil 8 reverses, the induced magnetic flux reverses now weakening the flux intensity at the position shown in FIG. 11 but strengthening the flux intensity at the next position as shown in FIG. 10. The flux switches are physically attracted to complete flux circuits, and the stronger the flux the stronger the attraction. Once the motor is spinning at a speed synchronous with the electronic frequency, the flux switches 44 are attracted strongly to a pair of flux conducting portions 24 and 32 or 22 and 34 as it approaches. Then, as it departs, that attraction weakens and attraction to the next pair 24 and 32 or 22 and 34 strengthens. In this embodiment from a stationary state the direction of motor rotation is not determined since rotating clockwise and counter clockwise are equally likely. Once the motor is turning in a certain direction it will continue to go in that direction at exactly the frequency of the AC current in power coil 8. If the resistance torque on the motor reaches a critical threshold the motor will simply stall. In these ways embodiments of the present invention behave much like a synchronous motor. Embodiments of the present invention are unlike a synchronous motor in that there are no repulsive forces since the flux switches 44 are not magnets. There is simply less and more attraction from one station to the next rather than a repulsion from one station and an attraction to the next.

Figure 12:
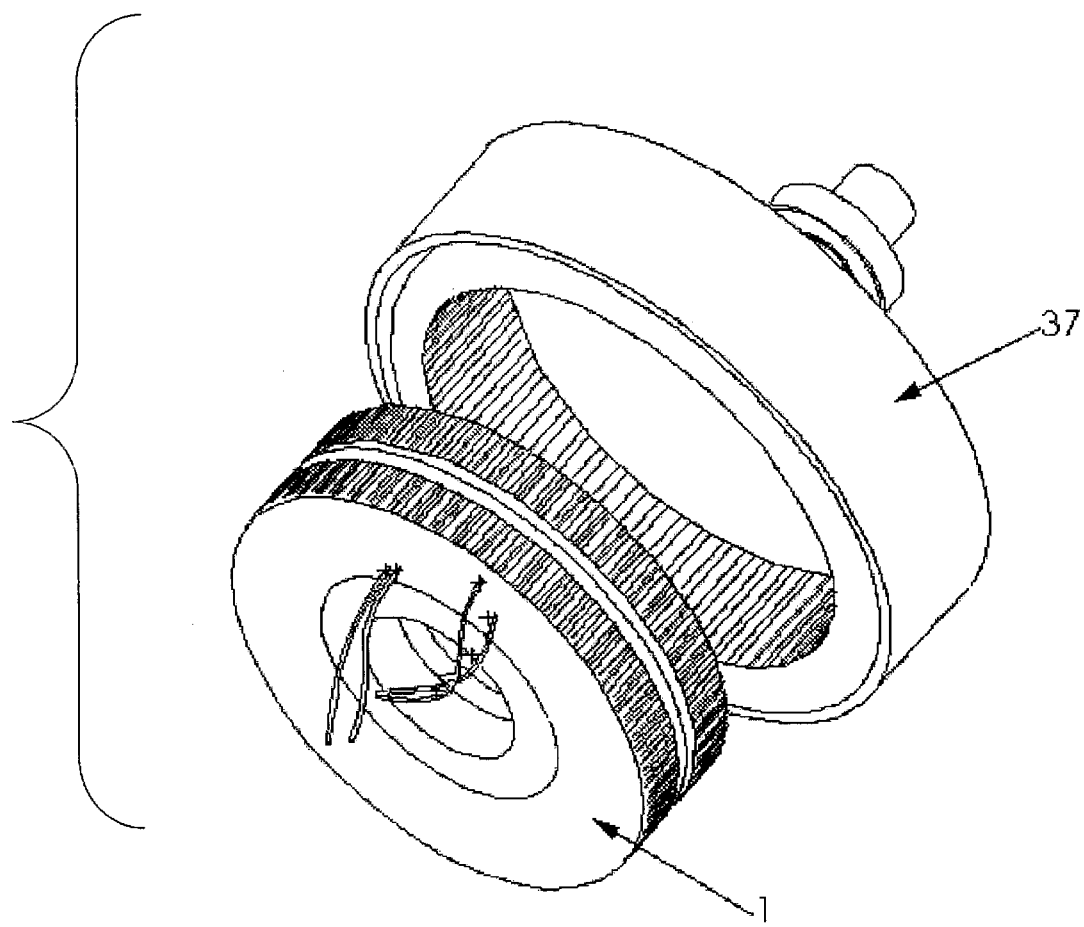
FIG. 12 shows an assembled and potted stator and an assembled and potted rotor according to an embodiment of the present invention.

Embodiments of the present invention benefit from being potted (filled with epoxy) to maintain the dimensional stability between flux conductors 20,30 and flux switches 44. All of the components are solid state and durable, according to embodiments of the invention, and therefore will not need maintenance. Furthermore, the only motion is between the stator 1 and the rotor 37, so that in final assembly there need be only two components, a fully potted stator 1 and a fully potted rotor 37. FIG. 12 shows a potted stator 1 assembly and a potted rotor 37 assembly.

The frequency of the voltage in the power coil 8 is the same as the frequency at which the magnetic field reverses. In the devices illustrated, there are sixty flux conducting laminates 20 connected to the north magnetic pole and sixty flux conducting laminates 30 connected to the south magnetic pole. Therefore, for every revolution of the rotor, the magnetic field reverses sixty times. This is equivalent to a sixty pole alternator, although the device is achieved with a single magnet and optionally is contained in a much smaller physical space than a prior art alternator with sixty poles. The device optionally is designed with a larger number of flux conducting laminates 20, 30 so that the number of poles is increased. One design consideration is that the laminates generally should be sufficiently spaced from one another to minimize flux leakage between the laminates. According to one embodiment, the laminates are spaced from each other by at least 0.050 inches to minimize flux leakage. Embodiments of the invention use sixty flux switches 44 arranged every six degrees around the rotor cup 38 so that they all contact a similar pair of north and south pole laminates 20, 30 simultaneously.

The device shown and described has an output frequency equal to sixty times the rotational speed of the rotor. For a rotor speed of 100 RPM, the output frequency would be 6000 cycles per minute or 100 Hz. This is in comparison to a typical 6 pole alternator according to the prior art which would have an output frequency of 10 Hz for the same rotor speed. Due to the high electrical frequency at a given rotational speed, the device operates at a significantly higher voltage compared to prior art motors and alternators operating at the same rotational speed. The voltage is proportional to the rate of change of magnetic flux. Therefore, for a given magnetic field strength, the rate of change increases with frequency and voltage increases proportionally. This provides several advantages over typical prior art motors and alternators. First, the current flowing through the output coil is reduced by a factor of 10 due to the ten fold increase in voltage so that resistive losses in the coil are reduced by a factor of 100, since resistive losses are equal to current squared multiplied by resistance. Alternately, the device could have fewer turns of wire in the output coil compared to a typical prior art device and produce the same output voltage and current. By reducing the length (number of turns) of the wire by a factor of ten the cost of the coil is also reduced by a factor of ten as well as resistive losses being reduced by a factor of ten. The toroidal shape of the output coil optionally further reduces the impedance losses in the windings, thereby providing additional efficiency gains.

The increase in frequency and voltage allows a very high power density for the device. The power density of the device according to embodiments of the present invention is approximately 10 times higher than that of a typical prior art six pole motor or alternator. In other words, for a given power rating the device optionally is packaged in a space only $\frac{1}{10}^{th}$ that required for a typical prior art motor or alternator. This makes the device significantly more attractive for uses where space or weight are important.

A prior art alternator possibly could be spun at a higher rotational speed to gain advantages related to those described in the above two paragraphs. However in prior art alternators core losses would make such a mode of operation inefficient. Significant reduction in core losses according to embodiments of the invention make higher electric frequency possible. Core losses are caused by hysteresis when the magnetic field reverses in a material, and electrical eddy currents induced in an electrically conducting material when the magnetic field varies within the material. Since the flux conductor 20, 30 material does not experience hysteresis, the only losses are due to eddy currents caused by the increase then decrease (but never reversal) of magnetic flux. Thus a material like powdered iron works well for the flux conductors since eddy currents are very small in powdered iron as compared to other materials of equivalent permeability.

Since the magnetic flux is only reversed in the flux switch 44, the hysteresis losses are only developed in a small portion of the magnetic path and so are greatly reduced. Because the flux switches 44 are so small, they optionally are optimized to minimize hysteresis and eddy current losses. The flux switches 44 optionally are made out of laminated steel to minimize loss. Due to their very small size, it optionally is economical to form the flux switches 44 out of met glass.

The above improvements in efficiency along with the higher frequency of the motor/alternator according to embodiments of the present invention help create such a vast improvement over prior art motor/alternators. Prior art motor/alternators are not efficient at such high frequencies precisely because of the dramatic increase in core losses due to hysteresis and eddy currents. The motor/alternator according to embodiments of the present invention not only provides the geometry to fit many poles in a small space, thus allowing for high electrical frequencies at modest rotational speed, but also provides significant reduction in core losses to make a high frequency motor/alternator practical.

Since the magnet 2 optionally is either a permanent magnet 12, an electromagnet 14, or a combination of the two, it is possible to vary the field strength as desired. This allows the device to be used as an infinitely variable voltage controller. Increasing the magnetic field at slow rotation and decreasing the magnetic field at fast rotation keeps the voltage constant, thereby eliminating the need for a gearbox or other transmission to be used with the device. This has implications for many uses of the device. For instance, when used as a generator connected to a fly wheel, it optionally is operated as a direct drive generator and puts out a constant voltage without the need for a gearbox. Another use of the variable magnetic field is to do the opposite of the above and decrease the magnetic field during start up to make rotation easier, then increase the magnetic field as the turbine runs faster to act as a braking system; thus a constant speed, variable output wind generator is possible. This saves significant cost and maintenance problems for wind turbines.

Since one embodiment of the motor/alternator of the present invention is in effect a sixty pole motor/alternator, cogging torque is reduced due to the even distribution of poles around the path of rotation. Instead of 6 poles in a conventional motor alternator creating six points in the path of rotation that must be mechanically overcome by external torque (as an alternator), there are sixty poles, thus sixty points in the rotation, with embodiments of the present invention. Embodiments of the present invention smooth out the torque around a complete rotation with only small increases every 3 degrees instead of large increases in torque every 30 degrees as with a conventional six pole motor/alternator.

Figure 13:
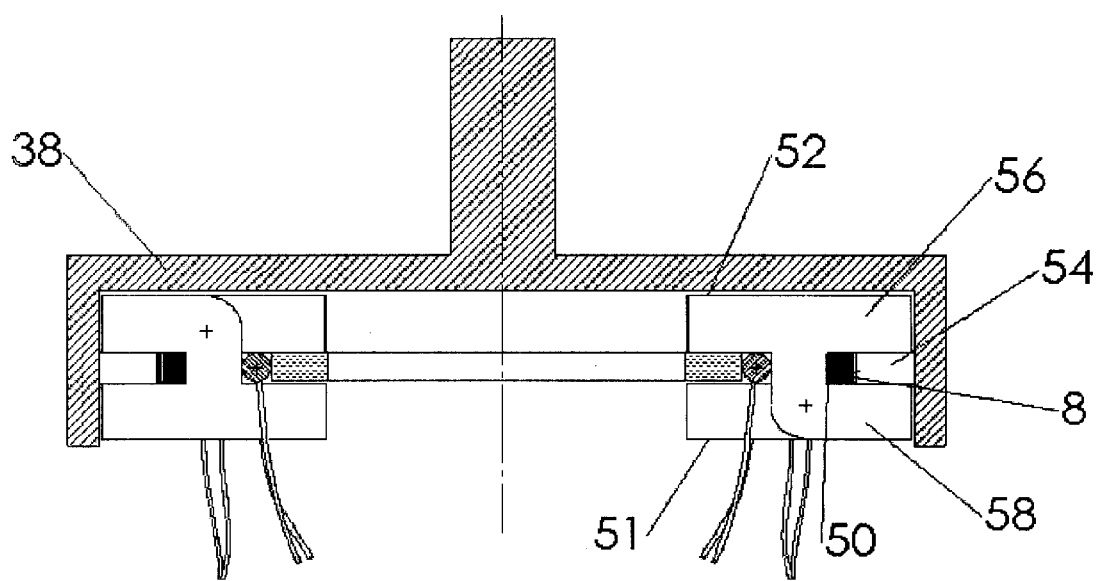
FIG. 13 shows a partial cross section of a motor alternator according to an embodiment of the present invention.

The second specifically described embodiment of the invention further optimizes operation as an alternator by minimizing the amount of material undergoing hysteresis. FIG. 13 shows a cross sectional view according to this embodiment, similar to the view shown in FIG. 9 for the first embodiment. Many of the elements of the second embodiment are the same as in the first embodiment, such as the magnet 2, the power coil 8, and the rotor cup 38. The second embodiment of the present invention makes use of a much deeper notch 50 in both north flux conductor laminates 52 and south flux conductor laminates 51 which contains the power coil 8 and a much smaller flux switch 54 now rotates within the notch 50. The north flux conductor laminate 52 has an elongated upper conducting portion 56 and elongated lower conducting portion 58. Although not shown in FIG. 13 the south flux conductor 51 similarly has a longer upper conducting portion 60 and lower conducting portion 62.

Figure 14:
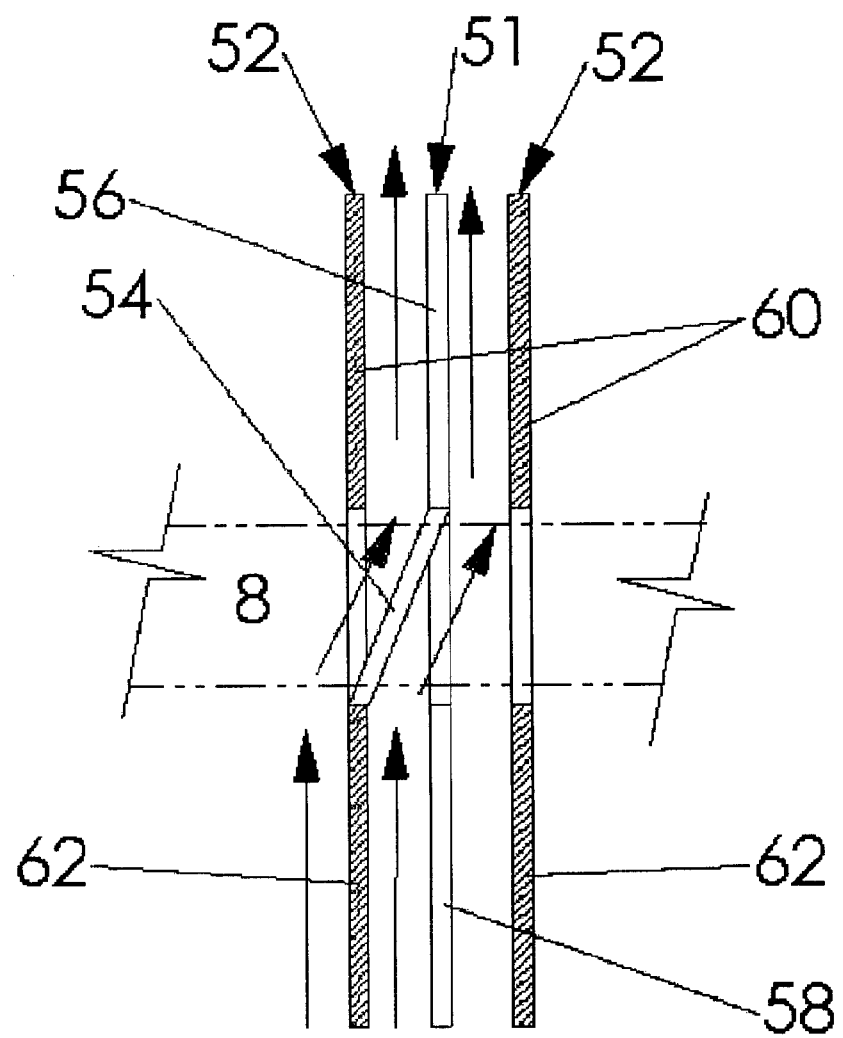
FIG. 14 shows magnetic flux in flux conductors during a first orientation of a rotor according to an embodiment of the present invention.
Figure 15:
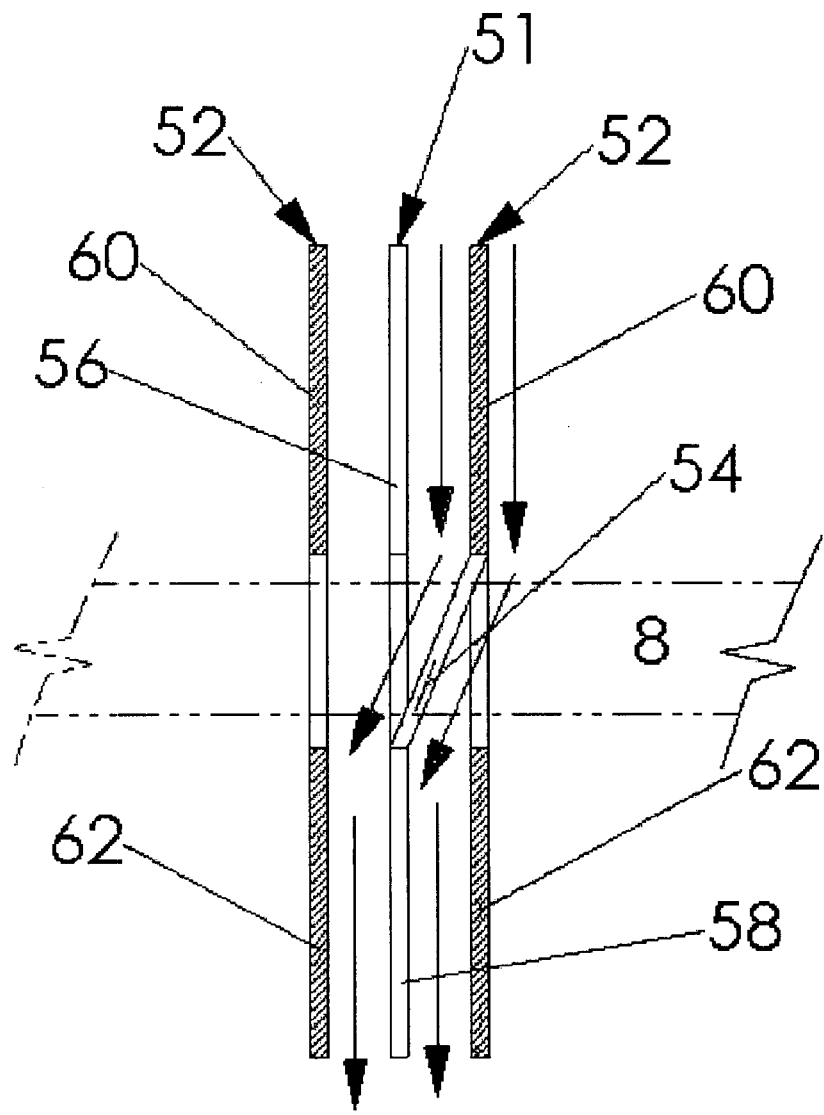
FIG. 15 shows magnetic flux in flux conductors during a second orientation of a rotor according to an embodiment of the present invention.

FIGS. 14 and 15 show cross sectional views of two north flux conductor laminates 52, one south flux conductor laminate 51 and one flux switch 54. It can be seen in these figures that the flux conductor laminates 51, 52 are flat and there is no longer an offset between the upper conducting portion 56, 60 and lower conducting portion 58, 62 of the laminates 51, 52 as there is in the first embodiment. It can also be seen that the flux switch 54 is tilted at an angle such that it contacts one upper conducting portion 56, 60 of one polarity and an adjacent lower conducting portion 62, 58 of opposite polarity. In the second embodiment the flux conductors 51,52 and the flux switch 54 are flat shapes which will greatly ease manufacturing. FIGS. 14 and 15 show the sequence as the flux switch 54 rotates past the flux conducting laminates 51,52. In FIG. 14 the flux switch is connecting a northern upper conducting portion 56 to the adjacent southern lower conducting portion 62. In FIG. 15 a moment later the flux switch is connecting a southern upper conducting portion 60 with an adjacent northern lower conducting portion 58, thus the magnetic field reverses direction around the power coil 8 between FIGS. 14 and 15.

One advantage of the second embodiment is the small flux switch 54. Since the flux switch 54 is the only part of this embodiment undergoing hysteresis, the smaller the flux switch the smaller the hysteresis losses will be. Furthermore with a small flux switch of simple shape it optionally is economical to build the flux switches out of exotic materials such as met glass, which experience extremely small hysteresis losses. The flux switch 54 may decrease in size up until the point that magnetic flux leakage between opposing flux conductors 51, 52 becomes a problem due to a very narrow notch 50.

The third specifically described embodiment of the present invention is a three-phase motor/alternator. The three-phase embodiment described herein is optimized for low hysteresis losses and uses a similar flux conductor and flux switch layout as the single phase alternator described as the second specifically described embodiment of the invention. Other layouts for a three phase version are possible (such as one similar to the first embodiment specifically described herein, or one with an internal rotor) and are considered to be included within the scope the present invention.

Figure 16:
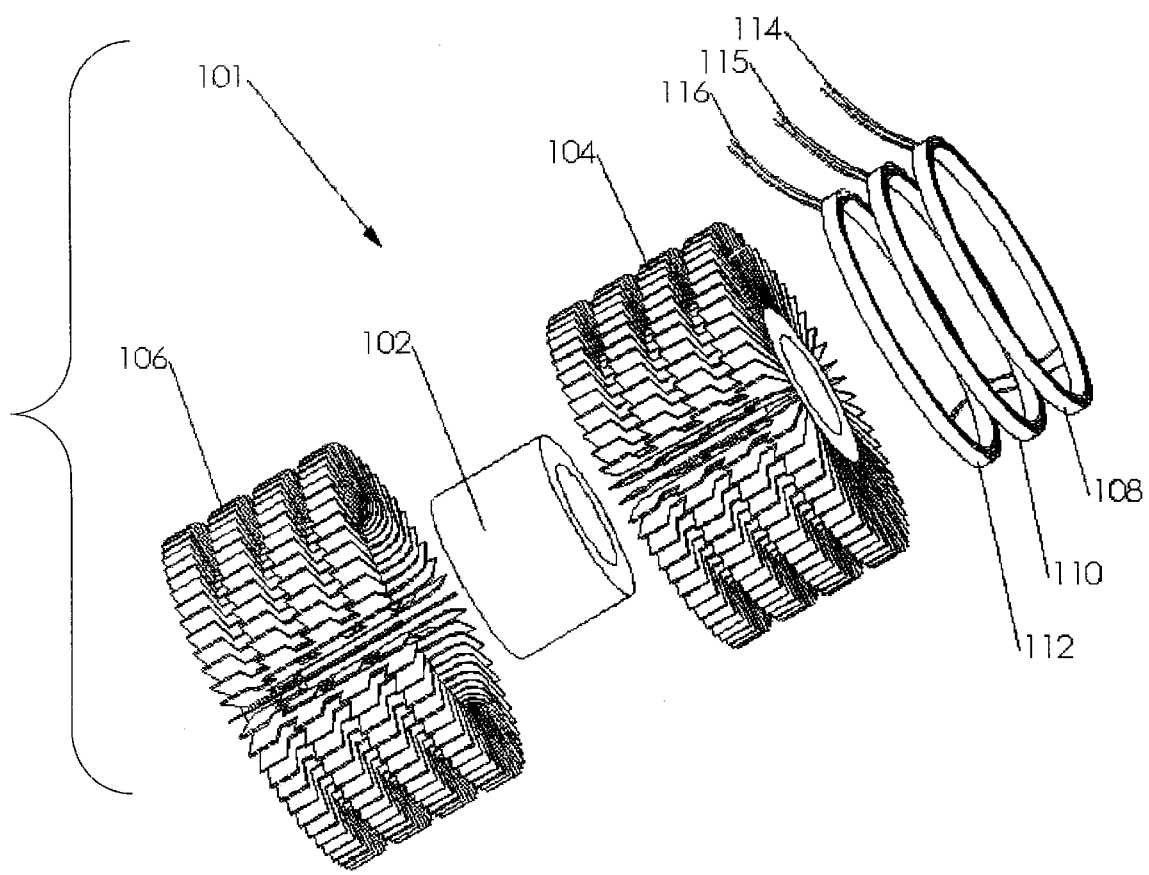
FIG. 16 shows an exploded view of a stator assembly according to an embodiment of the present invention.
Figure 21:
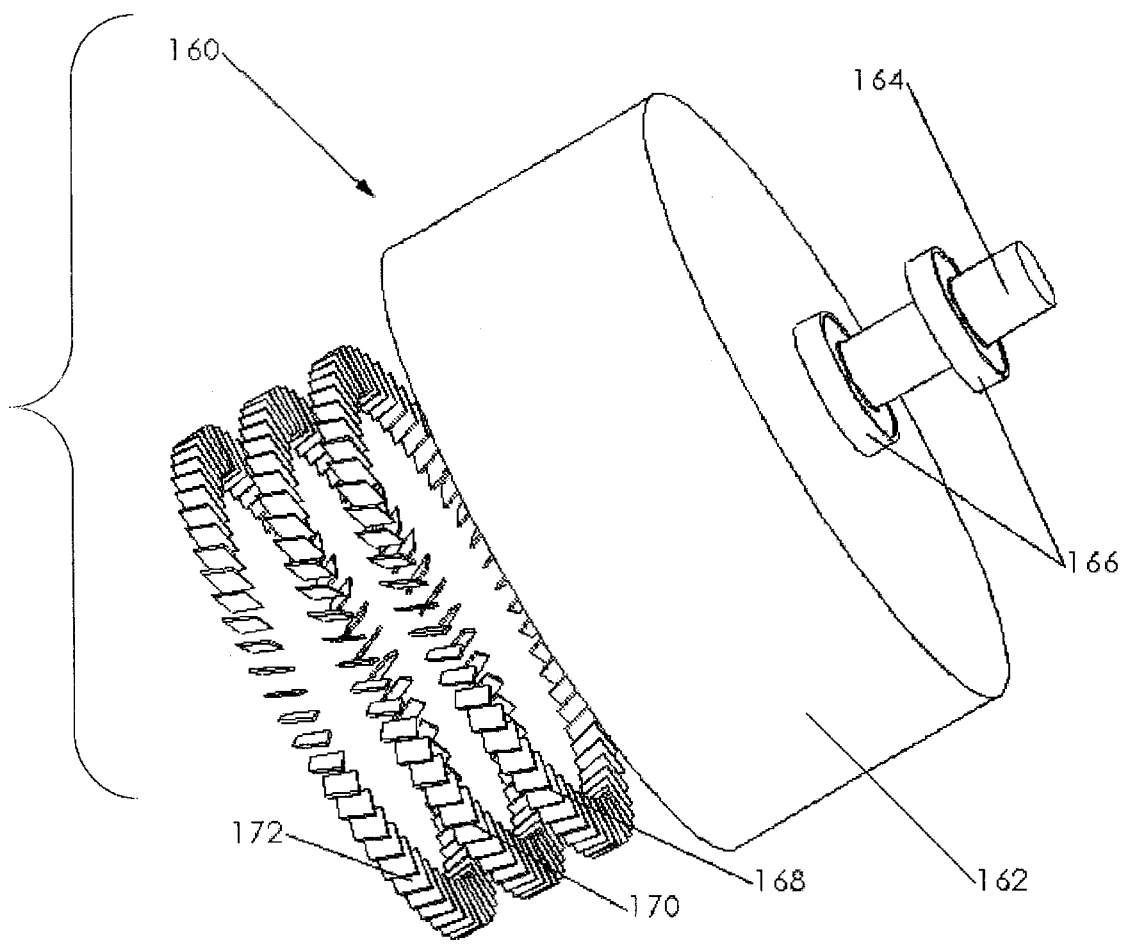
FIG. 21 shows an exploded view of a rotor assembly according to an embodiment of the present invention.

The three phase, third embodiment of the invention contains a stator 101 shown in FIG. 16 and a rotor 160 shown in FIG. 21. FIG. 16 shows the components of the stator 101. The stator 101 has a ring magnet 102, a set of north pole flux conductors 104, a set of south pole flux conductors 106, and three power coils 108, 110, 112. The north and south pole flux conductors 104 and 106 are in direct contact with the magnet 102. Similar to the previous embodiments the flux conductors are optionally made of a material that easily conducts a magnetic field and resists eddy currents, such as powdered iron. The flux conductors 104 and 106 direct the magnetic field of the magnet 102 toward the power coils 108, 110, 112. The power coils 108, 110, 112 are electrical coils in which electrical voltage is generated when the device is used as an alternator. When used as a motor, the power coils 108, 110, 112 provide voltage and current to power the device. Each power coil 108, 110, 112 includes electrical leads 114, 115, 116 respectively that collect the output power when the device is used as an alternator or provide power when it is used as a motor. Each power coil's 108, 110, 112 power wave form is 120 degrees out of phase with the other two. When combined, the outputs of the three power coils 108, 110, 112 produce three phase power. The magnet 102 in the three phase embodiment is similar in all respects to the magnet 2 (see FIG. 2) in the single phase embodiment, including a permanent magnet, an electromagnet, or both in the form of a hybrid magnet.

Figure 17:
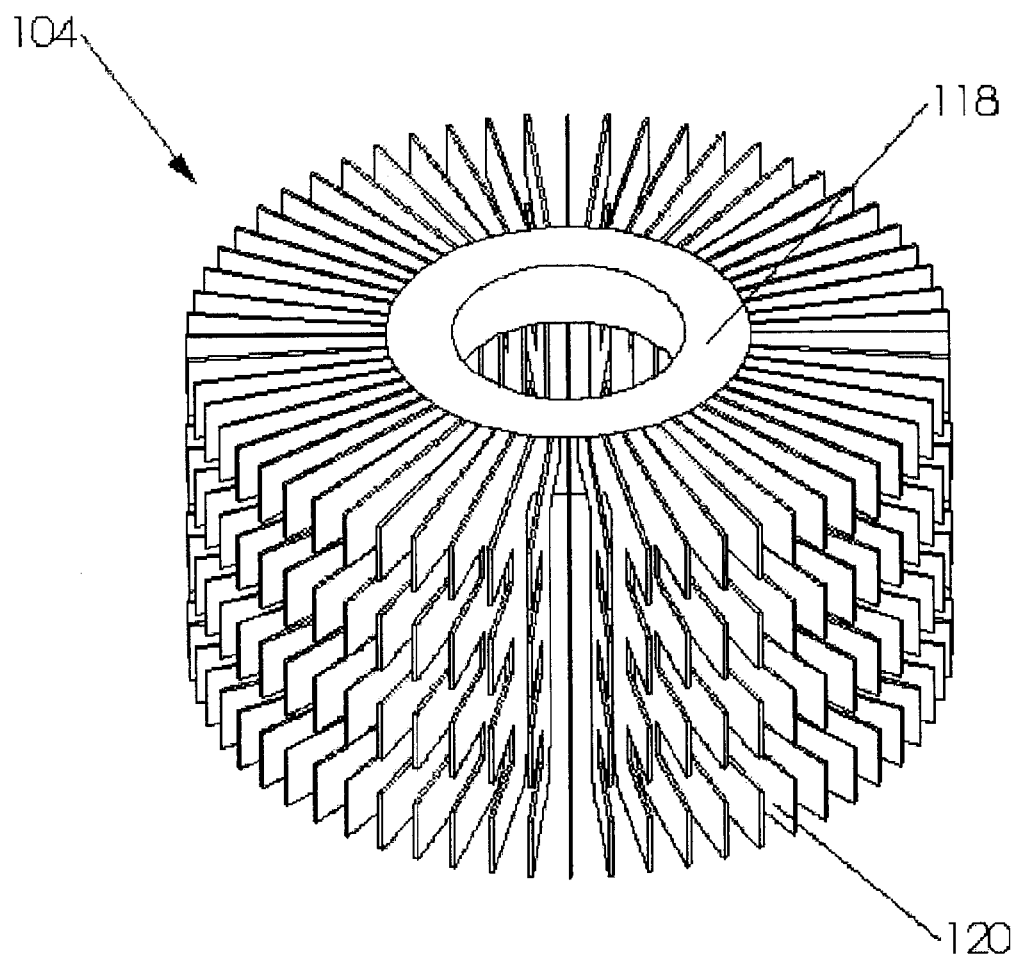
FIG. 17 shows flux conductors connected to the north pole of a magnet according to an embodiment of the present invention.

The flux conductors 104 that connect to the north pole of the magnet 102 (not shown) are optionally formed as a single piece as shown in FIG. 17. The flux conductors include a mounting ring 118 that provides a structural support for the flux conductor. Mounting ring 118 contacts the north side of the magnet 102 and retains the magnet 102 in its place. Attached to the mounting ring 118 are a plurality of flux conductor laminates 120. The laminates 120 conduct the magnetic field from the magnet 102 to the appropriate locations. Each laminate 120 extends radially outward from the mounting ring 118 and splits into four conducting portions.

Figure 18:
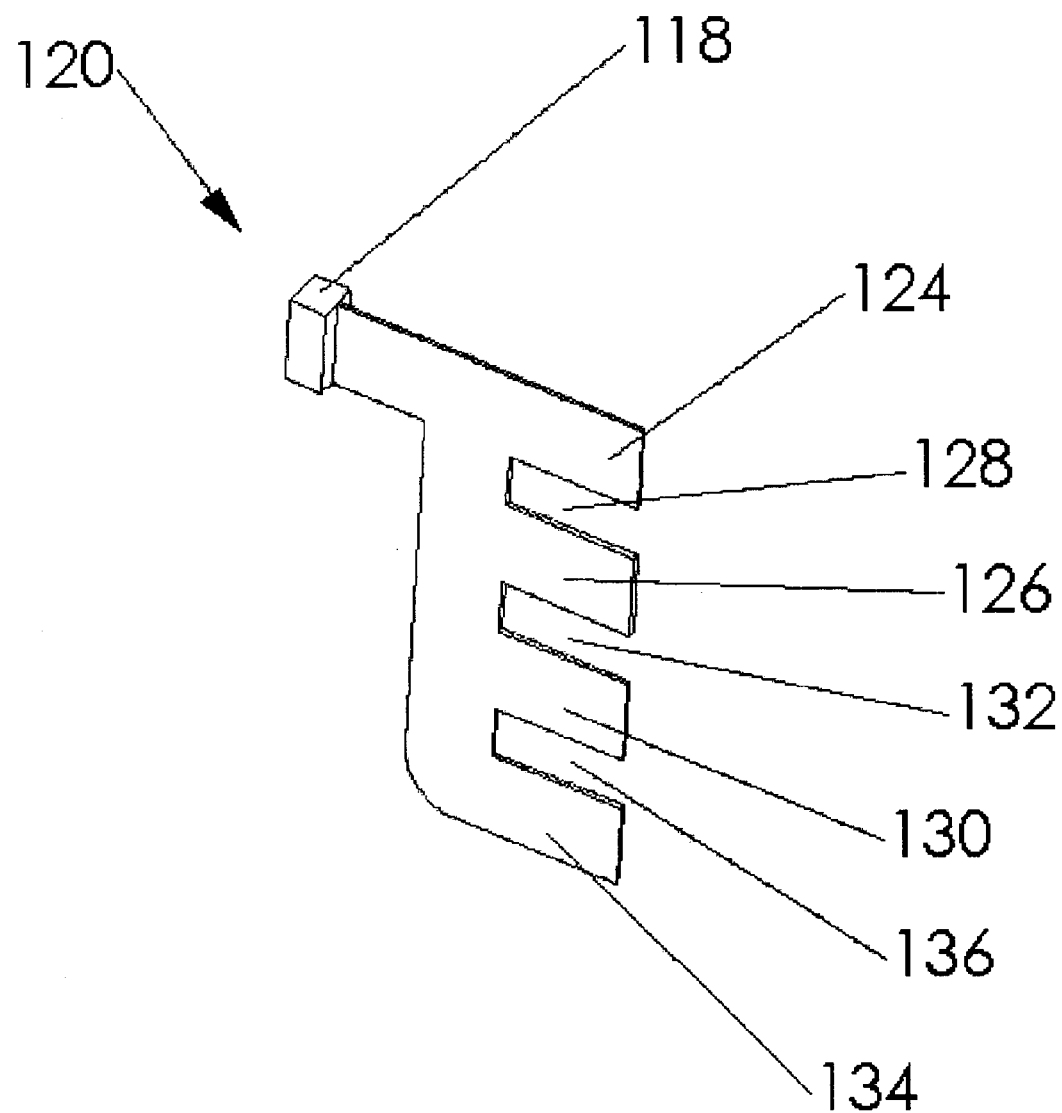
FIG. 18 shows a single north flux conducting laminate according to an embodiment of the present invention.

FIG. 18 shows a single north flux conductor laminate 120. The laminate 120 is a flat piece having four conducting portions which are described here in descending order as shown in FIG. 18. It should be noted that the words 'top', 'upper', 'lower', and 'bottom' are used here for clarity in reference to how they appear in the figure. Such use of descriptive labels here and elsewhere in the description are intended to help clearly distinguish similar elements and in no way limit the present invention. A top conducting portion 124 extends directly radially outward from the mounting ring 118. An upper conducting portion 126 extends downwardly from the top conducting portion 124. In between the top and upper conducting portions 124, 126, there is a notch 128 defined within each laminate 120 to hold the power coil 108 (not shown). A lower conducting portion 130 extends downwardly from the upper conducting portion 126. In between the upper and lower conducting portions 126, 130, there is a notch 132 defined within each laminate 120 to hold the power coil 110 (not shown). A bottom conducting portion 134 extends downwardly from the lower conducting portion 130. In between the lower and bottom conducting portions 130, 134, there is a notch 136 defined within each laminate 120 to hold the power coil 112 (not shown). In one embodiment, the flux conductor 104 of FIG. 17 includes sixty laminates 120 so that the separation between two laminates 120 is six degrees. The flux conductor 104 is optionally cast as a single piece out of powdered metal. However, the flux conductor 104 optionally is fabricated so that the mounting ring 118 is a single piece and each laminate 120 is a separate piece that is securely attached to the mounting ring 118.

Figure 19:
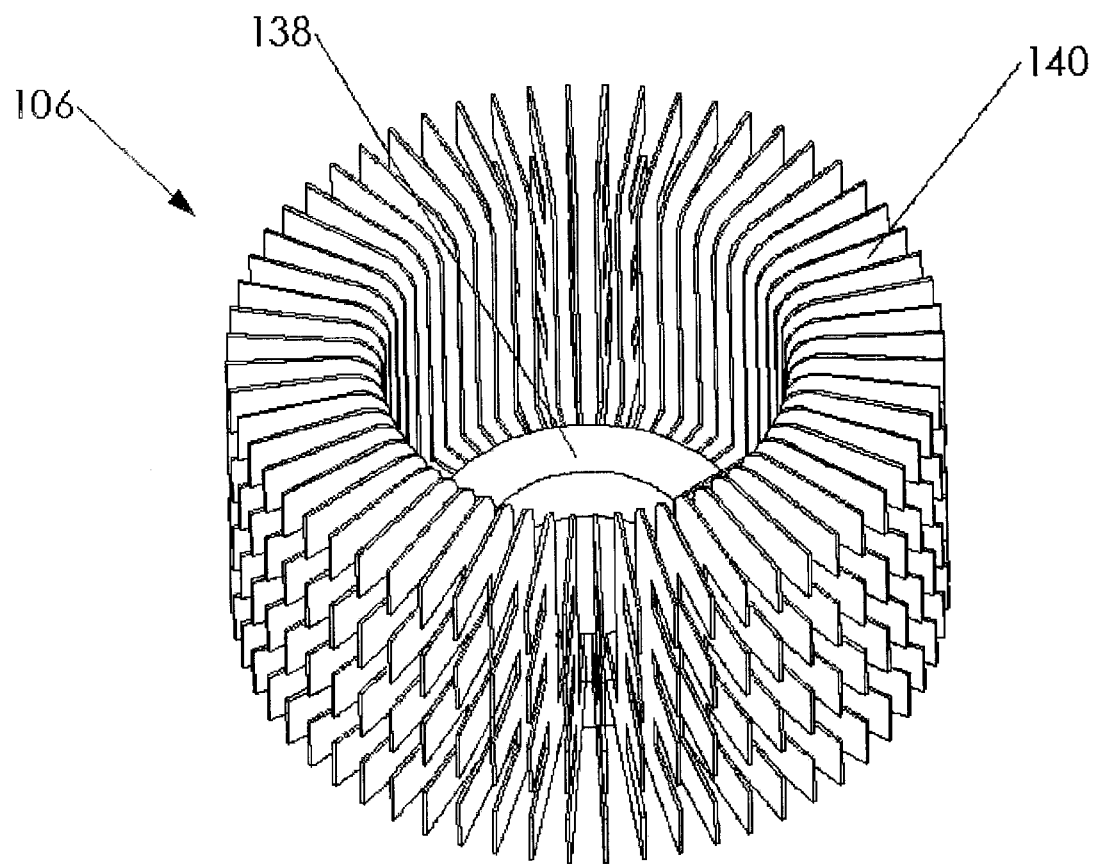
FIG. 19 shows flux conductors connected to the south pole of a magnet according to an embodiment of the present invention.

Another set of flux conductors 106 is shown in FIG. 19. The flux conductors 106 are magnetically connected to the south pole of the magnet 102. Flux conductors 106 are of similar construction to flux conductors 104 of FIG. 17 simply inverted. Flux conductors 106 include a mounting ring 138 that connects to the south pole of the magnet 102. Laminates 140 project radially outwardly from the mounting ring 138.

Figure 20:
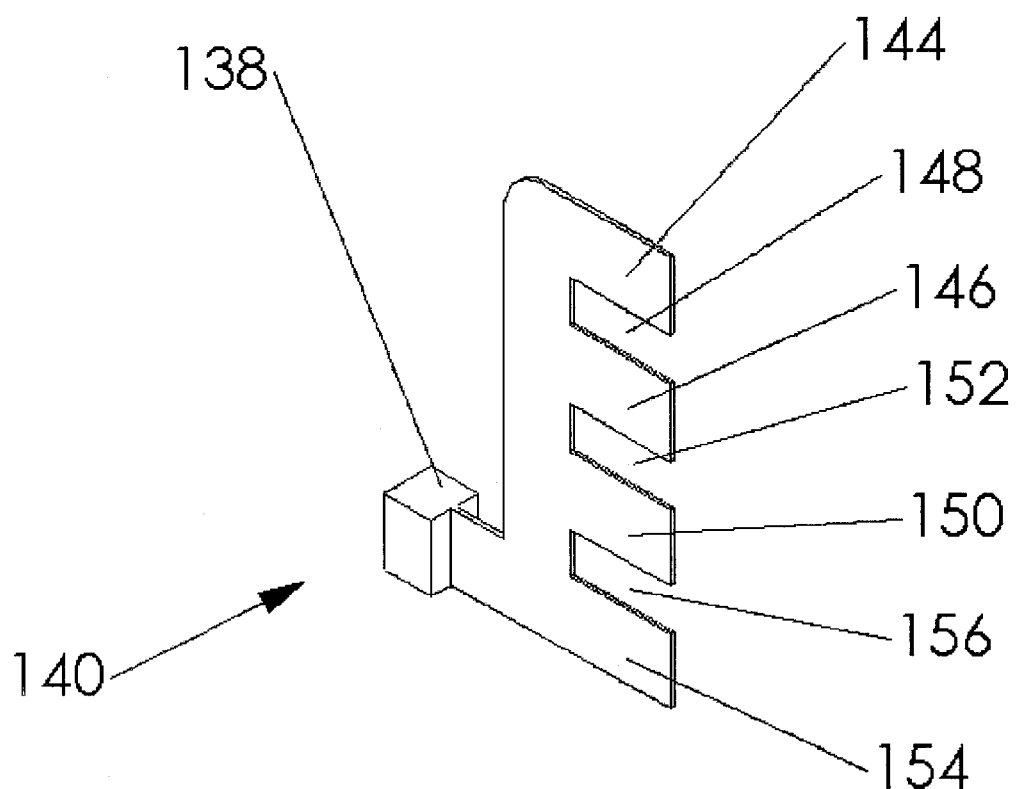
FIG. 20 shows a single south flux conducting laminate according to an embodiment of the present invention.

FIG. 20 shows a single flux conducting laminate 140 of flux conductor 106. The laminate 140 is a flat piece and is separated into four conducting portions described in descending order as shown in FIG. 20; a top conducting portion 144, an upper conducting portion 146, a lower conducting portion 150, and a bottom conducting portion 154. The bottom conducting portion 154 extends directly radially outward from the mounting ring 138. Notches 148, 152, and 156 are defined between the conducting portions 144, 146, 150, 154 as shown and hold the power coils 108, 110, and 112 (not shown) respectively.

Flux conductors 104 and 106 are oriented relative to each other so that the laminates 120 of the north pole flux conductors 104 are interspersed with the laminates 140 of the south pole flux conductors 106. The laminates 120, 140 are spaced so that there will be little or no flux leakage through the air gap between adjacent laminates.

Up to this point, only the stator 101 of the third specifically described embodiment motor/alternator has been discussed. FIG. 21 shows the rotor 160 of the motor/alternator. The rotor 160 includes a rotor cup 162 mounted on a shaft 164 that rotates in bearings 166. The shaft 164 is driven by the device described herein when it acts as a motor or it drives the device described herein when it acts as an alternator, according to embodiments of the invention. Attached to the inside of the rotor cup 162 there are a plurality of flux switches 168, 170, 172 arrayed into three circumferential rows one below the next which in descending order as shown in the FIG. 21 will be called a high row of flux switches 168, a middle row of flux switches 170, and a low row of flux switches 172. It should be noted that the words 'high', 'middle', and 'low' are used here for clarity in reference to how they appear in the figure. Such use of descriptive labels here and elsewhere in the description are intended to help clearly distinguish similar elements and in no way limit the present invention. One embodiment includes sixty flux switches 168, 170, 172 in each row attached to the inside of the rotor cup 162 at six degree intervals. Each row is rotationally offset from the other two by 2 degrees. The flux switches 168, 170, 172 are installed through slots (not shown) in the rotor cup 162 after rotor 160 is placed over the assembled stator 101. The high flux switches 168 rotate through the notches 128, 148 in the flux conducting laminates 120, 140. The middle flux switches 170 rotate through the notches 132, 152, and the low flux switches 172 rotate through notches 136, 156 in flux conducting laminates 120, 140. The operation of the flux switches 168, 170, 172 in conducting flux between north flux conducting laminates 120 and south flux conducting laminates 140 produces three phase power as will be more clearly shown in FIGS. 22, 23, 24, and 25.

FIGS. 22, 23, 24, and 25 show a sequence as one set of three flux switches, a high flux switch 168, a middle flux switch 170, and a low flux switch 172 rotate through three degrees of arc, or one half cycle. The rotation in this series of figures is in the clockwise direction as seen from above. Shown are the power coils 108, 110, and 112, two north flux conducting laminates 120, having top 124, upper 126, lower 130, and bottom 134, conducting portions, and two south flux conducting laminates 140, having top 144, upper 146, lower 150, and bottom 154, conducting portions. In each figure only the conducting portions mentioned in the figure's description are labeled. Arrows on the flux switch 168, 170, or 172 and on the flux conductors 120, 140 indicate position and direction of peak magnetic flux flow. An arrow on a power coil 108, 110, or 112 indicates direction of peak electric current flow. For the purpose of this explanation current is defined as positive when flowing to the right as shown and negative when flowing to the left as shown.

Figure 22:
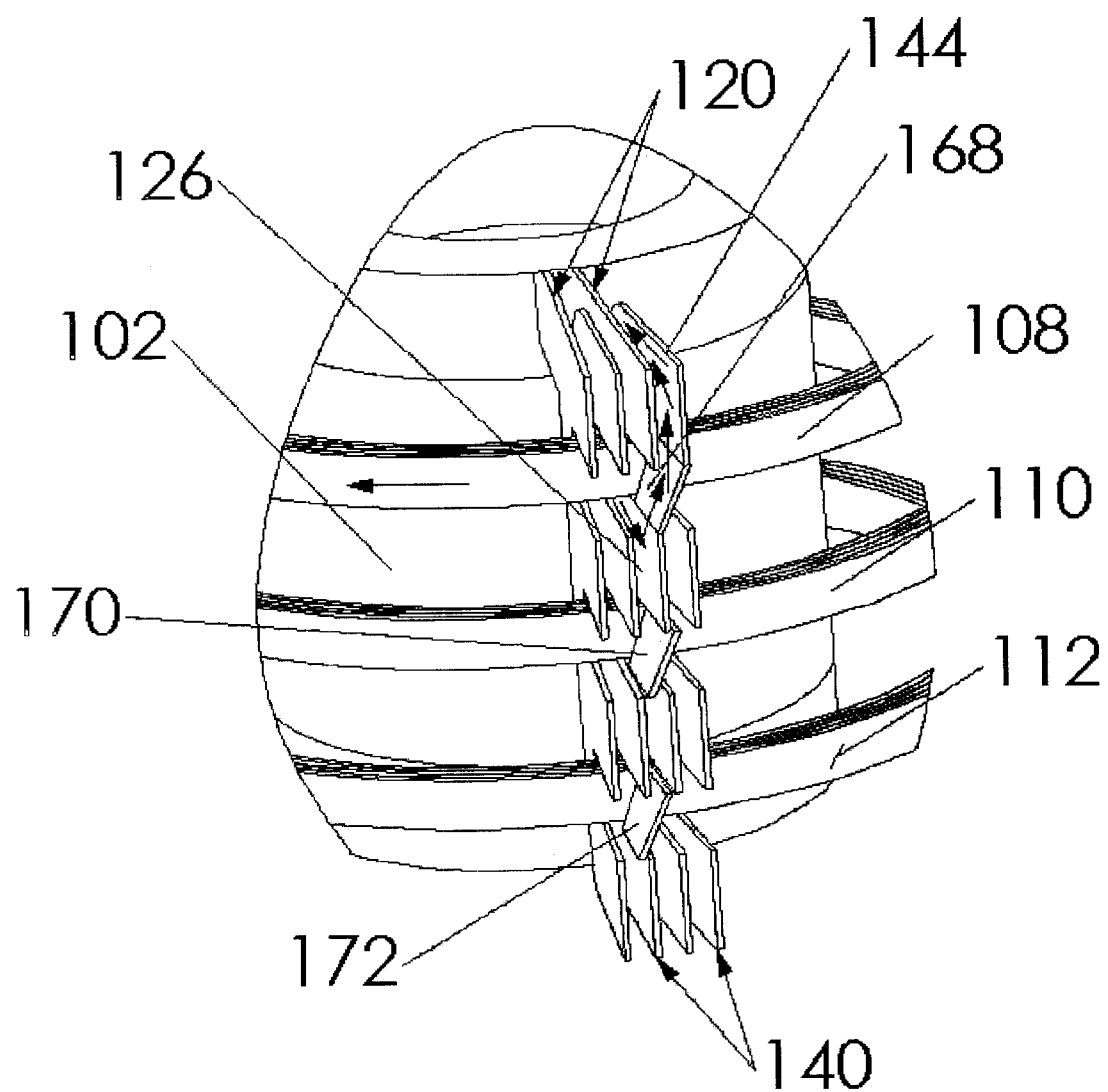
FIG. 22 shows magnetic flux in flux conductors during a first orientation of a rotor according to an embodiment of the present invention.

In FIG. 22 high flux conductor 168 is magnetically connecting a top conducting portion 144 of a south flux laminate 140 to an upper conducting potion 126 of a north flux laminate 120 causing flux to rotate around power coil 108 in a counter clockwise direction inducing electric current to flow in power coil 108 to the left or negative direction. Depending on the details of construction of the flux conducting laminates 120, 140 and flux switches 168, 170, 172 there optionally also is some small amount of current flow induced in the two power coils 108, 110, 112 not mentioned (in this figure coils 110 and 112) and such would be the case if standard three phase power output were desired. For the purpose of this explanation, only the peak current and flux are illustrated and discussed.

Figure 23:
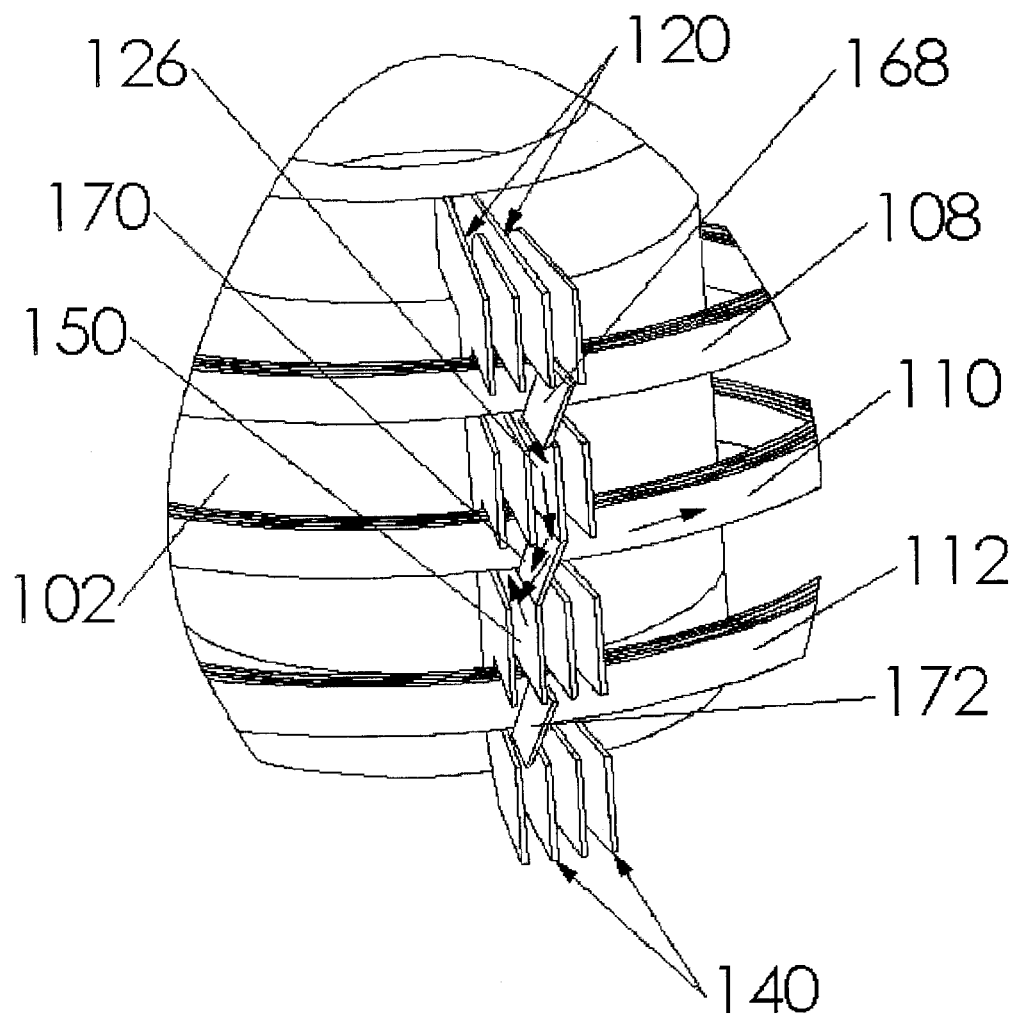
FIG. 23 shows magnetic flux in flux conductors during a second orientation of a rotor according to an embodiment of the present invention.

FIG. 23 is the same view as FIG. 22 one degree of rotation later. The middle flux switch 170 is magnetically connecting an upper conducting portion 126 of a north flux laminate 120 to a lower conducting potion 150 of a south flux laminate 140 causing flux to rotate around power coil 110 in a clockwise direction inducing electric current to flow in power coil 110 to the right or positive direction.

Figure 24:
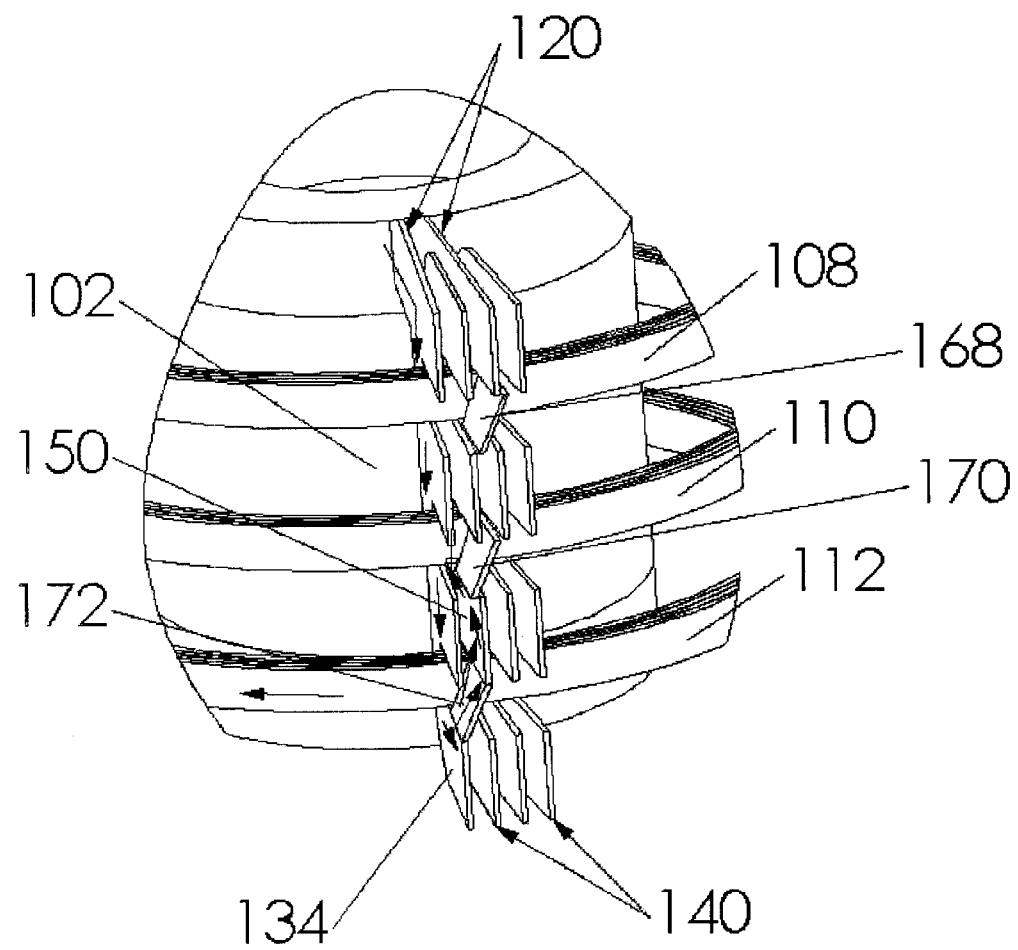
FIG. 24 shows magnetic flux in flux conductors during a third orientation of a rotor according to an embodiment of the present invention.

FIG. 24 is the same view as FIG. 22 two degrees of rotation later. The low flux conductor 172 is magnetically connecting a lower conducting portion 150 of a south flux laminate 140 to a bottom conducting potion 134 of a north flux laminate 120 causing flux to rotate around power coil 112 in a counter clockwise direction inducing electric current to flow in power coil 112 to the left or negative direction.

Figure 25:
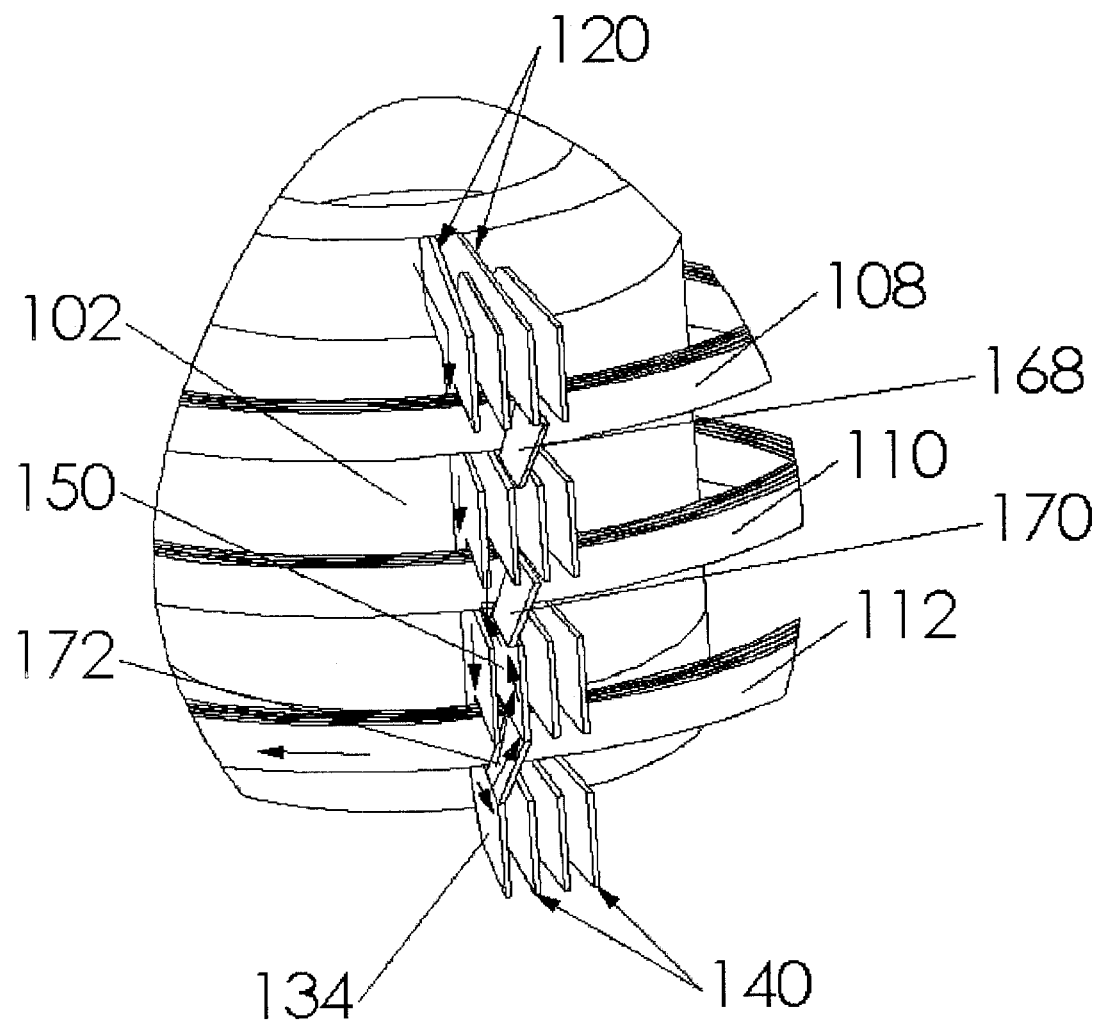
FIG. 25 shows magnetic flux in flux conductors during a fourth orientation of a rotor according to an embodiment of the present invention.

FIG. 25 is the same view as FIG. 22 three degrees of rotation later. The high flux conductor 168 is magnetically connecting a top conducting portion 124 of a north flux laminate 120 to an upper conducting potion 146 of a south flux laminate 140 causing flux to rotate around power coil 108 in a clockwise direction inducing electric current to flow in power coil 108 to the right or positive direction, which is the opposite of FIG. 22. Thus the current flow has been reversed in power coil 108 completing the half cycle over three degrees of rotation.

Three-phase embodiments of the invention have the advantage of directionality, i.e. there is a forward and a backward. In single-phase embodiments the direction of rotation is undetermined when used as a motor, but with three phase embodiments there is a clear path of rotation (clockwise in the embodiment shown in FIGS. 23–26). With proper controls, the direction of rotation optionally is reversed by switching the relative phase of power supplied to any two of the power coils 108, 110, 112. Furthermore it should be noted that in the third specifically described embodiment of the present invention the motor/alternator has sixty poles, and three phases, but still uses only one magnet.

A benefit according to embodiments of the invention is the low inertia of the rotor. Since only the flux switches turn, they optionally are made very lightweight for uses in which rotor inertia is a critical issue. To further reduce the rotor's inertia, it is possible to reverse the configuration of the device so that the magnet is on the outside of the stator and the power coil is on the inside. This allows the flux switch to be located on the inside of the rotor where it will have a lower moment of inertia and the rotor will be lighter.

Figure 26:
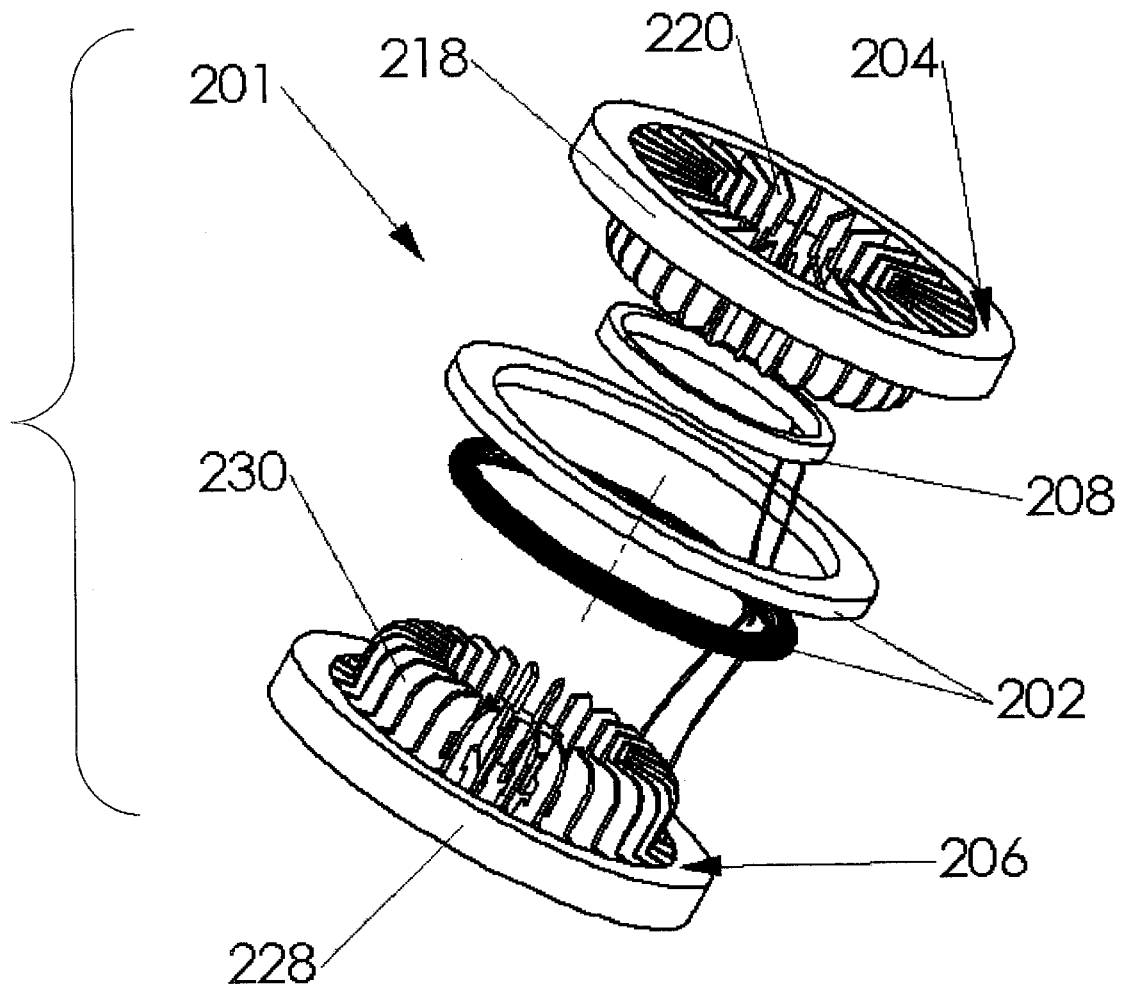
FIG. 26 shows an exploded view of a stator assembly according to an embodiment of the present invention.

A single-phase internal rotor variation of the device is described as the fourth specifically described embodiment of the invention. While a single-phase device is described in the fourth embodiment it is to be understood that the interior rotor configuration could be used equally well with a three-phase device. FIG. 26 shows an exploded view of the stator 201 of the fourth embodiment of the present invention. The stator 201 has a ring magnet 202, a set of north pole flux conductors 204, a set of south pole flux conductors 206, and a power coil 208 similar to the other embodiments. The flux conductors 204 and 206 direct the magnetic field of the magnet 202 on the outside toward the power coil 208 on the inside.

The flux conductors 204 and 206 are optionally formed as a single piece as in the other three embodiments. The flux conductors 204, 206 include a mounting ring 218, 228 that provides a structural support for the flux conductor 204, 206 and hold the magnet 202 in place. Attached to the mounting rings 218, 228 are a plurality of flux conductor laminates 220, 230 respectively. The laminates 220, 230 conduct the magnetic field from the magnet 202 to the appropriate locations.

Flux conductors 204 and 206 are oriented relative to each other so that the laminates 220 of the north pole flux conductors 204 are interspersed with the laminates 230 of the south pole flux conductors 206. The laminates 220,230 are spaced appropriately so that there will be little or no flux leakage through the air gap between adjacent laminates.

Figure 27:
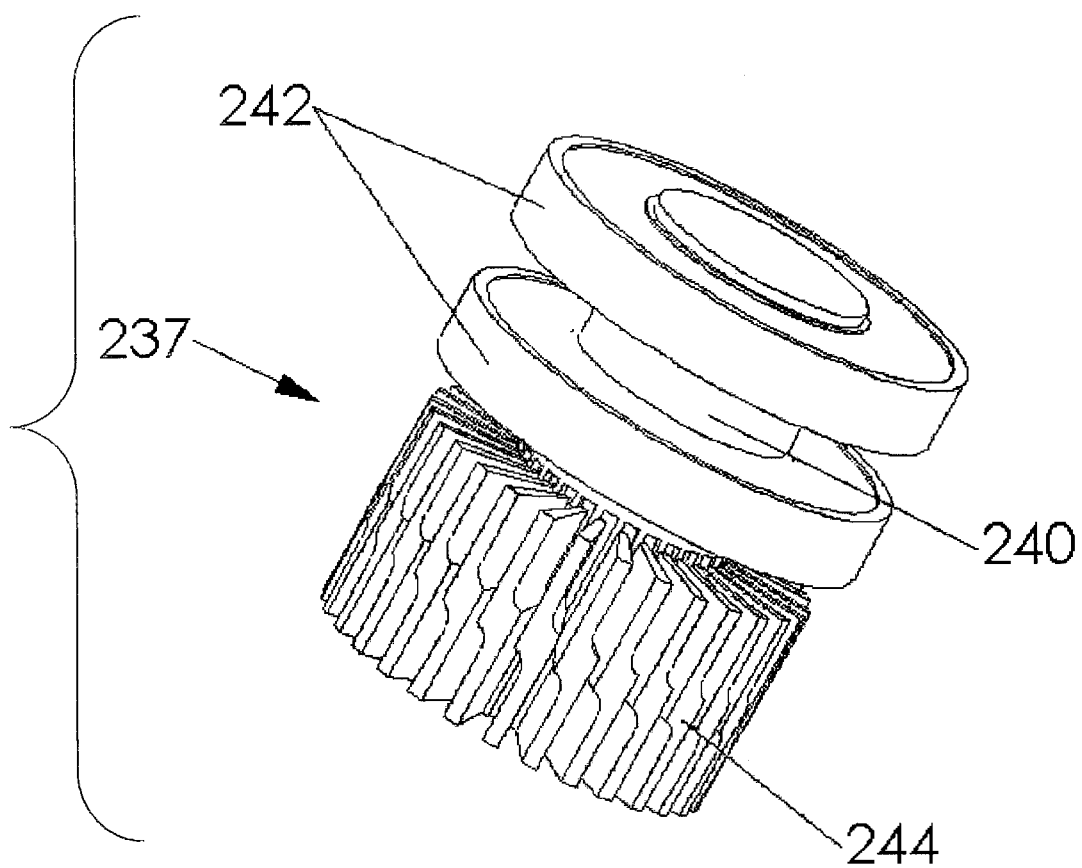
FIG. 27 shows a rotor assembly according to an embodiment of the present invention.

FIG. 27 shows the rotor 237 of the fourth embodiment motor/alternator of the present invention. The rotor 237 includes a rotor shaft 240 that rotates in bearings 242. The shaft 240 is driven by the device of the present invention in its various embodiments when it acts as a motor or it drives the device of the present invention in its various embodiments when it acts as an alternator. Mounted to the outside of the shaft 240 is a plurality of flux switches 244. One embodiment includes sixty flux switches 244 attached to the shaft 240 at six degree intervals. Each flux switch 244 has a double bend in its midsection such that it connects an upper conducting potion 222, 232 with an adjacent lower conducting portion 234, 224 of opposite polarity.

Figure 28:
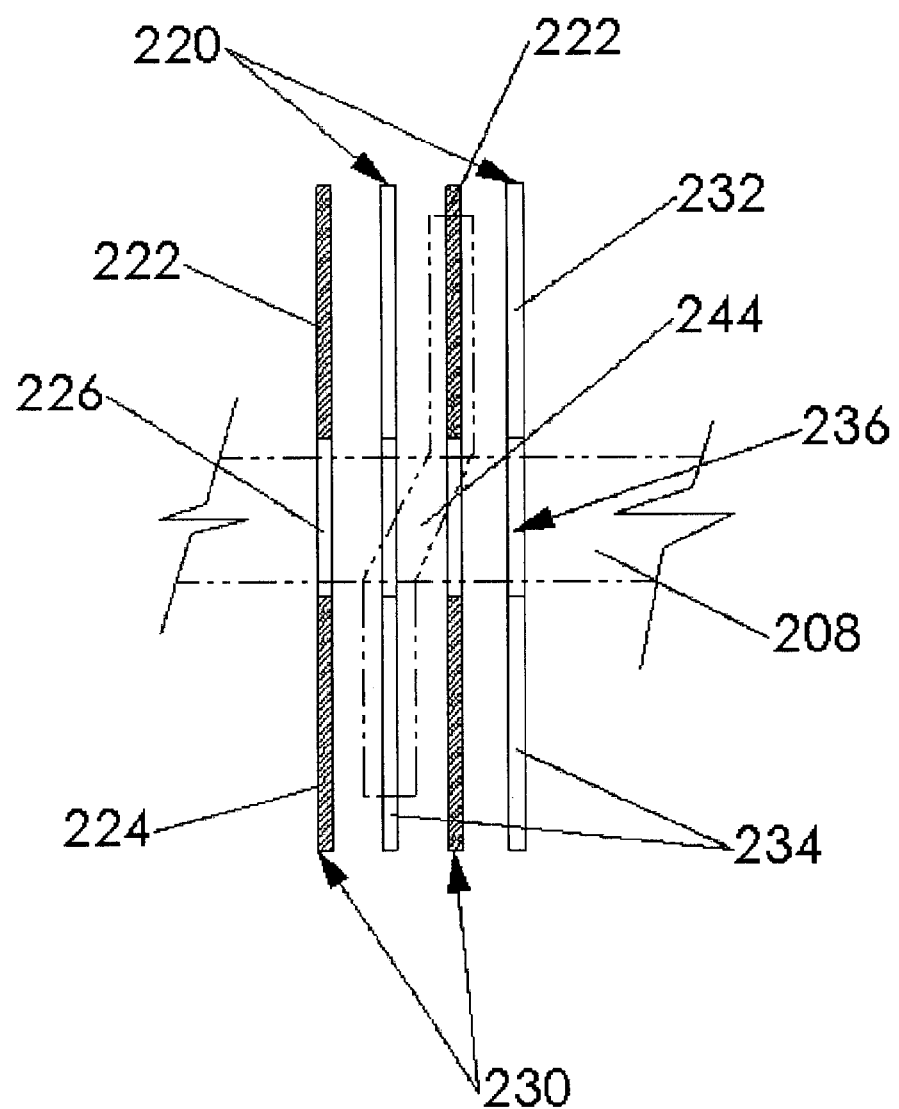
FIG. 28 shows a cut away view of flux conductors and a flux switch according to an embodiment of the present invention.

FIG. 28 shows a cut away view of the fourth specifically described embodiment of the present invention where a flux switch 244 and two north flux conducting laminates 220 and two south flux conducting laminates 230 are shown. Each laminate 220, 230 splits into two conducting portions. Thus a north laminate 220 has an upper conducting portion 222 and a lower conducting portion 224 with a notch 226 defined between them and a south laminate 230 has an upper conducting portion 232 and a lower conducting portion 234 with a notch 236 defined between them. The flux switch 244 is connecting the upper conducting portion 222 of a north flux conducting laminate 220 with a lower conducting portion 234 of a south flux conducting laminate.

Figure 29:
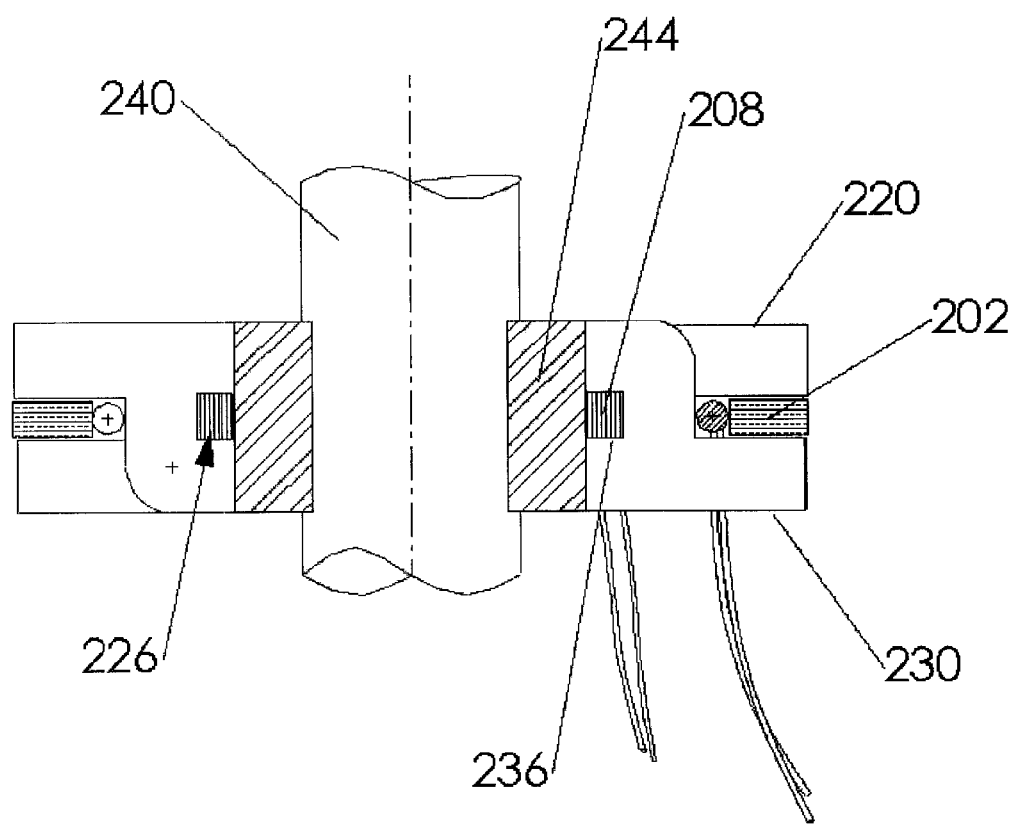
FIG. 29 shows a partial cross section of a motor/alternator according to an embodiment of the present invention.

FIG. 29 shows a sectional side view of the fourth embodiment motor/alternator of the present invention, similar to the views shown in FIG. 9 for the first embodiment and FIG. 13 for the second embodiment. Mounted to the rotor shaft 240, there is a flux switch 244 that rotates along with the shaft 240. The stator includes a magnet 202 which provides a magnetic field with the north pole facing upward and the south pole facing downward. Flux conductors 204 and 206 are in contact with the magnet 202. The flux conductors 204 and 206 include notches 226 and 236 in which the power coil 208 is mounted. The flux switch 244 contacts the flux conductors 204 and 206 to complete a magnetic circuit and conduct the magnetic flux from magnet 202.

The fourth embodiment shows a different geometry (rotor 237 on the inside, stator 201 on the outside, double bend in the flux switch 244) from the previous embodiments of the present invention. This newly described geometry helps to decrease the inertia of the rotor. There are other geometries that are possible and still well within the scope of the present invention and these alternate geometries may provide some advantage. For example a layout in which the stator and rotor both terminate in flat disks which abut each other is possible and optionally is desirable for ease of construction, or for generating power across a membrane. Thus the rotor is not on the inside or the outside of the stator but on the face of the stator. Another potential form is as a linear motor/alternator where flux conductors are arrayed in a straight line and flux switches are attached to a reciprocating shaft. Such a linear alternator would be useful in use with a Stirling motor, for example. It is intended that the above and other geometries and variations in layout that produce the same or similar electromagnetic effect be included in the scope of the present invention. The specifically described embodiments illustrate some of the variations that the present invention may embody but are in no way intended to limit the scope of the invention.

It should be noted that one difference between embodiments of the present invention and prior art motors and alternators is basic orientation of magnetic fields and motion. In prior art motors and alternators the axis of rotation, the orientation of the magnetic field, and the line of relative motion between the stator and rotor, are all perpendicular to each other. In embodiments of the present invention the orientation of the magnetic field and the axis of rotation are parallel and each perpendicular to the line of relative motion between the rotor and the stator. This difference optionally allows embodiments of the present invention to be used where prior art motors and alternators are impractical, such as generating or transmitting power across a membrane as mentioned above.

The electrical machine of the present invention, in the specifically described embodiments above, consists of several components. The components include a magnet (element 2 in FIG. 1 for example), an electrical conductor arranged to form a loop (element 8 in FIG. 1 for example), a plurality of flux conductors (elements 4 and 6 in FIG. 1 for example) which direct magnetic flux from the magnet through the electrical conductor, wherein a first set of flux conductors (element 4 in FIG. 1 for example) directs magnetic flux through the electrical conductor in a first direction and a second set of flux conductors (element 6 in FIG. 1 for example) directs magnetic flux through the electrical conductor in a second direction, and a switch (element 44 in FIG. 8 for example) for alternately connecting and disconnecting the first and second sets of flux conductors. The switch may optionally be attached to a rotor of the electrical machine and motive force may optionally be applied to the rotor to induce electrical current to flow in the electrical conductor, or alternating electrical current may optionally be applied to the electrical conductor to impart motion to the rotor. It should be noted that the loop of electrical conductor and the magnet are optionally annular in shape although they may take different shapes or forms. The magnet and the electrical conductor may optionally be concentrically oriented, although other orientations may be possible. If the magnet and electrical conductor are annular and they are concentrically oriented, the magnet may optionally have a smaller diameter than the electrical conductor and may optionally be arranged inside the periphery of the electrical conductor or the electrical conductor may optionally have a smaller diameter than the magnet and may optionally be arranged inside the periphery of the magnet. The flux conductors may optionally be formed from powdered iron, although other materials may also work well. The switch may optionally be formed from laminated steel or met glass, although other materials may also work well for the switch. The electrical machine of the present invention may optionally include three electrical conductors each arranged to form a loop, wherein the flux conductors direct magnetic flux from the magnet through the loops of all three electrical conductors. In this case, the electrical machine would include switches for alternately connecting and disconnecting the flux conductors through all three electrical conductors such that the electrical machine operates as a three phase machine. The magnet that is used in the electrical machine of the present invention may optionally be either a permanent magnet, an electromagnet, or a hybrid that includes a permanent magnet and an electromagnet in juxtaposition such that the magnetic fields of the permanent magnet and the electromagnet are additive.

While embodiments of the invention have been shown and described, it will be apparent to those skilled in the art that various modifications may be made in these embodiments without departing from the scope of the invention. Therefore, it is intended that the invention not necessarily be limited to the particular embodiments described and illustrated herein.

What is claimed is:

1. An electrical machine comprising:
   a magnet,
   an electrical conductor arranged to form a loop,
   a plurality of flux conductors which direct magnetic flux from said magnet through said loop of electrical conductor, wherein a first set of said flux conductors directs said magnetic flux through said loop in a first direction and a second set of said flux conductors directs said magnetic flux through said loop in a second direction, and
   a switch for alternately connecting and disconnecting said first and second sets of flux conductors.

2. The electrical machine of claim 1 wherein said switch is attached to a rotor of the electrical machine.

3. The electrical machine of claim 2 wherein motive force is applied to said rotor to induce electrical current to flow in said electrical conductor.

4. The electrical machine of claim 2 wherein alternating electrical current is applied to said electrical conductor to impart motion to said rotor.

5. The electrical machine of claim 1 wherein said magnet and said electrical conductor are both annular in shape.

6. The electrical machine of claim 5 wherein said magnet and said electrical conductor are concentrically oriented.

7. The electrical machine of claim 6 wherein said magnet has a smaller diameter than said electrical conductor and is arranged inside the periphery of said electrical conductor.

8. The electrical machine of claim 6 wherein said electrical conductor has a smaller diameter than said magnet and is arranged inside the periphery of said magnet.

9. The electrical machine of claim 1 wherein said flux conductors are formed from powdered iron.

10. The electrical machine of claim 1 wherein said switch is formed from laminated steel.

11. The electrical machine of claim 1 wherein said switch is formed from met glass.

12. The electrical machine of claim 1 further comprising two additional electrical conductors each arranged to form a loop, wherein said plurality of flux conductors direct the magnetic flux from said magnet through the loops of all three electrical conductors and further comprising a plurality of switches for alternately connecting and disconnecting the flux conductors through all three electrical conductors such that said electrical machine operates as a three phase machine.

13. The electrical machine of claim 1 wherein said magnet is a permanent magnet.

14. The electrical machine of claim 1 wherein said magnet is an electromagnet.

15. The electrical machine of claim 1 wherein said magnet is a hybrid comprising a permanent magnet and an electromagnet in juxtaposition such that the magnetic fields of said permanent magnet and said electromagnet are additive.

16. A method of generating electricity comprising:
    providing a magnet,
    providing an electrical conductor arranged to form a loop,
    using a plurality of flux conductors to direct magnetic flux from said magnet through said loop of electrical conductor, wherein a first set of said flux conductors directs said magnetic flux through said loop in a first direction and a second set of said flux conductors directs said magnetic flux through said loop in a second direction, and
    switching said flux conductors alternately between an open and closed state to induce an alternating electrical current in said electrical conductor.

17. The method of claim 16 wherein said method further comprises the steps of providing a switch on a rotor and turning said rotor to move said switch between alternate ones of said flux conductors to alternately switch said flux conductors between the open and closed state.

18. The method of claim 17 further comprising the step of rectifying the alternating electrical current in said electrical conductor to direct current.

19. A method of providing motive force comprising:
    providing a magnet,
    providing an electrical conductor arranged to form a loop,
    using a plurality of flux conductors to direct magnetic flux from said magnet through said loop of electrical conductor, wherein a first set of said flux conductors directs said magnetic flux through said loop in a first direction and a second set of said flux conductors directs said magnetic flux through said loop in a second direction,
    switching said flux conductors between an open and closed state using a switch on a rotor, and
    providing an alternating electrical current in said electrical conductor such that said switch is moved between successive flux conductors as the polarity of said alternating electrical current changes signs.

20. The method of claim 19 further comprising the steps of:
    providing second and third electrical conductors each being arranged in a loop,
    using a plurality of flux conductors to direct magnetic flux from said magnet through said loops of said second and third electrical conductors, wherein a first set of said flux conductors directs said magnetic flux through said second and third loops in a first direction and a second set of said flux conductors directs said magnetic flux through said second and third loops in a second direction, switching said flux conductors between an open and closed state using switches on a rotor, and providing three phase alternating electrical current in said electrical conductors such that said switches are moved between successive flux conductors to turn said rotor in a predetermined direction.

21. An electrical machine comprising:

a source of magnetic flux, an electrical conductor arranged to form a loop, a plurality of flux conductors which direct magnetic flux from said source of magnetic flux through said loop of electrical conductor, wherein a first set of said flux conductors directs said magnetic flux through said loop in a first direction and a second set of said flux conductors directs said magnetic flux through said loop in a second direction, and a switch for alternately connecting and disconnecting said first and second sets of flux conductors.

22. An electrical machine comprising:

a magnet, an loop of electrically conductive material, a plurality of flux conductors which direct magnetic flux from said magnet through said loop of electrically conductive material, wherein a first set of said flux conductors directs said magnetic flux through said loop in a first direction and a second set of said flux conductors directs said magnetic flux through said loop in a second direction, and a switch for alternately connecting and disconnecting said first and second sets of flux conductors.

23. An electrical machine comprising:

a magnet, an electrical conductor arranged to form a loop, means for directing magnetic flux from said magnet through said loop of electrical conductor, including a first means for directing said magnetic flux through said loop in a first direction and a second means for directing said magnetic flux through said loop in a second direction, and a switch for alternately connecting and disconnecting said first and second means for directing magnetic flux.

24. An electrical machine comprising:

a magnet, an electrical conductor arranged to form a loop, a plurality of flux conductors which direct magnetic flux from said magnet through said loop of electrical conductor, wherein a first set of said flux conductors directs said magnetic flux through said loop in a first direction and a second set of said flux conductors directs said magnetic flux through said loop in a second direction, and a switch for alternately contacting said first and second sets of flux conductors to complete first and second magnetic circuits.

* * * * *